(12) United States Patent
Higashi et al.

(10) Patent No.: US 8,282,377 B2
(45) Date of Patent: Oct. 9, 2012

(54) METHOD AND APPARATUS FOR PRODUCING A THREE-DIMENSIONALLY SHAPED OBJECT

(75) Inventors: Yoshikazu Higashi, Moriyama (JP); Satoshi Abe, Moriguchi (JP); Norio Yoshida, Kitakatsuragi-gun (JP); Masataka Takenami, Kadoma (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 12/461,598

(22) Filed: Aug. 18, 2009

(65) Prior Publication Data

US 2010/0044922 A1    Feb. 25, 2010

(30) Foreign Application Priority Data

Aug. 22, 2008 (JP) ................................. 2008-214206

(51) Int. Cl.
*B29C 35/08* (2006.01)
(52) U.S. Cl. .............. 425/174.4; 264/401; 264/497; 264/308; 264/113; 359/845; 425/375
(58) Field of Classification Search ............... 425/174.4, 425/375; 264/308, 113, 401, 497; 359/845
See application file for complete search history.

(56) References Cited

U.S. PATENT DOCUMENTS

| | | | | |
|---|---|---|---|---|
| 3,909,118 A | * | 9/1975 | Schmidt | 359/845 |
| 3,923,383 A | * | 12/1975 | Engel et al. | 359/845 |
| 4,110,013 A | * | 8/1978 | Eitel | 359/845 |
| 5,097,110 A | | 3/1992 | Hamada et al. | |
| 5,150,253 A | * | 9/1992 | Watanuki | 359/360 |
| 5,155,324 A | | 10/1992 | Deckard et al. | |
| 5,252,264 A | * | 10/1993 | Forderhase et al. | 264/497 |
| 5,420,848 A | * | 5/1995 | Date et al. | 369/53.25 |
| 5,493,388 A | * | 2/1996 | Adachi | 356/5.01 |
| 6,534,740 B1 | | 3/2003 | Meiners et al. | |
| 6,959,992 B2 | * | 11/2005 | Bischof | 359/845 |
| 2007/0170454 A1 | * | 7/2007 | Andrews | 257/100 |
| 2007/0241482 A1 | * | 10/2007 | Giller et al. | 264/494 |
| 2008/0131546 A1 | * | 6/2008 | Perret et al. | 425/143 |
| 2009/0106999 A1 | * | 4/2009 | Swoboda | 34/105 |

FOREIGN PATENT DOCUMENTS

| | | |
|---|---|---|
| DE | 69033313 | 4/2000 |
| DE | 19853979 | 5/2000 |
| EP | 0418519 | 10/1999 |

OTHER PUBLICATIONS

German Office Action dated Jun. 11, 2012 and the English translation thereof.

* cited by examiner

Primary Examiner — Joseph Del Sole
Assistant Examiner — Nahida Sultana
(74) Attorney, Agent, or Firm — Bacon & Thomas, PLLC

(57) ABSTRACT

In a method for producing a three-dimensionally shaped object, (i) a solidified layer is formed by irradiating a light beam on a specified portion of a powder layer to sinter or melt the specified portion. Further, (ii) another solidified layer is formed by placing a new powder layer on the solidified layer obtained in step (i), and irradiating the light beam on a specified portion of the new powder layer to sinter or melt the specified portion of the new powder layer. The steps (i) and (ii) are repeated to produce a three-dimensionally shaped object. In the method, a gas is supplied to a mirror used in scanning the light beam.

19 Claims, 18 Drawing Sheets

GAS (COMPRESSED AIR)

GAS (COMPRESSED AIR)

METHOD AND APPARATUS FOR PRODUCING A THREE-DIMENSIONALLY SHAPED OBJECT

FIELD OF THE INVENTION

The present invention relates to a method and apparatus for producing a three-dimensionally shaped object, and, more specifically, to a method and apparatus for producing a three-dimensionally shaped object having a plurality of solidified layers laminated one above another by repeating the step of irradiating a light beam on a specified portion of a powder layer to form a solidified layer.

BACKGROUND OF THE INVENTION

Conventionally, there is known a method for producing a three-dimensionally shaped object by irradiating a light beam on a powdery material, which method is usually referred to as a "powder sintering and laminating method". In this method, the three-dimensionally shaped object is produced by repeating (i) a step of irradiating a light beam on a specified portion of a powder layer to sinter or melt the same into a solidified layer or (ii) a step of placing a new powder layer on the solidified layer and irradiating the light beam on a specified portion of the new powder layer to form another solidified layer (see, e.g., Japanese Patent Laid-open Publication Nos. H1-502890 and 2000-73108). In case where a metal powder is used as the powdery material, the three-dimensionally shaped object thus produced can be used as a mold for molding a plastic article. In the event that a resin powder is used as the powdery material, the three-dimensionally shaped object thus produced can be used as a plastic article. This production method enables a three-dimensionally shaped object of complex shape to be produced within a short period of time.

In order to avoid oxidization of the three-dimensionally shaped object, the production thereof is performed within a chamber kept in a specified inert atmosphere. Installed inside the chamber are a powder layer forming unit, a substrate on which the powder layer and/or the solidified layer are placed, and so forth. A light beam irradiating unit is installed outside the chamber. The light beam emitted from the light beam irradiating unit is irradiated on a specified portion of the powder layer through a light transmission window of the chamber.

With the light beam irradiating unit shown in FIG. 1, the light beam L is emitted from a light beam oscillator 30 and then scanned on an arbitrary position of the powder layer by a scanner mirror such as a galvano-mirror 31 or the like. Thus the powdery material is sintered or molten into a solidified layer. Although the scanner mirror functions to reflect the light beam, the reflectivity thereof is not equal to 100% in practice (but is, e.g., about 90% to 98%). In other words, several percent of the thermal energy of the light beam incident on the scanner mirror are absorbed by a mirror unit. For that reason, the heat thus absorbed is transferred from the mirror unit to a scanner body (including, e.g., a mirror drive unit and a mirror control unit), resulting in an increase in the temperature of the scanner body. As a consequence, the scanner body goes through mechanical displacement (or deformation), which reduces the light beam irradiation accuracy.

In this regard, the mirror unit makes reciprocating swing movement about its drive shaft at a high speed during the course of scanning the light beam. (As shown in FIG. 2, the mirror unit 61 makes reciprocating swing movement, e.g., at a high speed of about 15 to 18 degrees/sec with a maximum swing angle of about ±15 degrees.) This requires the mirror to be lightweight. In other words, the mirror unit 61 needs to have a relatively small size, which means that the absorbed heat is easily transferred to the scanner body 62 (see FIG. 2). More specifically, the smaller the size of the mirror unit 61 becomes, the smaller the thermal capacity thereof is. Thus the temperature of the mirror unit 61 is apt to be increased under the influence of the external heat, allowing the heat to be transferred to the scanner body 62 with ease. In case where a metal powder is used as the powdery material, the energy of the light beam is high. (For example, the maximum output power of a carbon dioxide laser is kept as high as about 500 W.) This means that the influence of the absorbed heat becomes great, eventually increasing the possibility of reduction in the irradiation accuracy of the light beam.

SUMMARY OF THE INVENTION

In view of the above, the present invention provides a method and apparatus for producing a three-dimensionally shaped object, which is capable of preventing reduction in the irradiation accuracy of a light beam.

In accordance with an aspect of the present invention, there is provided a method for producing a three-dimensionally shaped object, including the steps of:

(i) forming a solidified layer by irradiating a light beam (e.g., a directive energy beam such as a laser beam or the like) on a specified portion of a powder layer to sinter or melt the specified portion;

(ii) forming another solidified layer by placing a new powder layer on the solidified layer obtained in step (i), and irradiating the light beam on a specified portion of the new powder layer to sinter or melt the specified portion of the new powder layer; and (iii) repeating the steps (i) and (ii) to produce a three-dimensionally shaped object, wherein a gas is supplied to a mirror (or a scanner mirror) used in scanning the light beam.

One of the features of the present invention resides in that a body unit of the scanner mirror is prevented from a temperature rise by directly cooling a mirror unit (especially, a galvano-mirror) of the scanner mirror with an air as shown in FIG. 3. Through an assiduous examination and research, the present inventors have found that a fast swinging mirror unit can be cooled by suitably using a gas stream in an air cooling operation.

In the subject specification, the term "mirror" essentially means a light deflector (scanner mirror) for reflecting a light beam to scan the same and includes, e.g., a galvano-mirror. The galvano-mirror is capable of making swing movement about an axis in the rotational direction and serves as a light deflector that can continuously change the path of light. In case of two-dimensionally scanning the light beam, the galvano-mirror essentially refers to an X-direction scanning galvano-mirror and a Y-direction scanning galvano-mirror (see FIGS. 4A to 4C). The term "scanner body unit" used herein essentially designates the portion other than the light-reflecting mirror unit and includes, e.g., a mirror drive unit and a mirror control unit.

The term "scan" used herein essentially means that the light beam generated in a light beam source is deflected by, e.g., reflection to reach a specified position.

The term "powder layer" used herein designates, e.g., either a metal powder layer or a resin powder layer. The term "specified portion of a powder layer" essentially refers to a region of a three-dimensionally shaped object to be produced. If a light beam is irradiated on the powder existing in the specified portion, the powder is sintered or molten into a three-dimensionally shaped object. The term "solidified layer" essentially denotes a sintered layer in case where the powder layer is a metal powder layer and signifies a cured layer in case where the powder layer is a resin powder layer.

In one preferred embodiment, the scanner mirror has a reflection surface for reflecting the light beam and a rear surface (or a back surface) positioned on the opposite side of the reflection surface. The gas is supplied or blown to the rear surface. In this case, it is preferred that fins are provided on the rear surface to allow the gas to flow over the entire area of the rear surface. This ensures that the gas blown is guided by the fins to evenly flow along the rear surface. Alternatively, it may be possible to provide fins for guiding the gas toward the portion of the rear surface where a greatest amount of heat is generated.

In another preferred embodiment, the supply of gas is not limited to the rear surface of the scanner mirror but may be performed with respect to the reflection surface of the scanner mirror insofar as it does not adversely affect the scanning operation of the light beam. In this case, it is preferred that the gas supplied to the reflection surface is an inert gas.

The supply of gas may be performed under a feedback control. In this instance, it is preferred that the temperature of the mirror unit is measured in advance so that the quantity and temperature of the supplied gas can be controlled depending on the temperature of the mirror unit thus measured.

In accordance with another aspect of the present invention, there is also provided an apparatus for producing a three-dimensionally shaped object, which is used in performing the production method set forth above. The apparatus for producing a three-dimensionally shaped object includes:

a unit for forming a powder layer;

a light beam irradiation unit for irradiating a light beam on a specified portion of the powder layer to form a solidified layer; and a substrate on which the powder layer and/or the solidified layer are formed, wherein the light beam irradiation unit includes a mirror (or a scanner mirror) for use in scanning the light beam and a gas supply member for supplying a gas to the mirror.

In one preferred embodiment, the gas supply member is movable in synchronization with the movement of the mirror. More specifically, the gas supply member makes reciprocating swing movement in synchronization with the reciprocating swing movement of the mirror unit. In other words, the gas supply member supplies the gas toward the mirror unit while making reciprocating swing movement.

In another preferred embodiment, the scanner mirror has a reflection surface for reflecting the light beam and a rear surface opposite to the reflection surface. The gas supply member has a gas outlet port facing the rear surface of the scanner mirror. It is preferred that fins are provided on the rear surface to allow the gas to flow over the entire area of the rear surface. Preferably, the fins are arranged in a symmetrical relationship with respect to the rotational axis (namely, the mirror axis) so that a balance can be established during the reciprocating swing movement of the mirror unit. The fins provided on the rear surface preferably include a conical column portion (central protruding portion) provided in the central area of the rear surface to protrude from the rear surface and a plurality of plate portions (radial protruding portions) radially extending from the conical column portion and protruding from the rear surface. The conical column portion is preferably provided with a top opening and a plurality of side openings, both of which remain in fluid communication with each other. (In this case, each of the side openings is positioned between two neighboring plate portions.) Alternatively, the fins may include two edge plates (edge protruding portions) provided in the two opposite peripheral edge regions (near-edge regions) of the rear surface to protrude from the rear surface and at least one intermediate plate (intermediate protruding portion) provided in a substantially parallel relationship with the edge plates to protrude from the rear surface. The term "fin" used herein essentially refers to a portion or member of blade shape or fin shape which is installed to guide the gas stream toward the mirror unit. The term "protrude" used herein means that the fins extend generally perpendicularly with respect to the rear surface or the reflection surface of the mirror unit.

The fins may be provided on the front reflection surface of the mirror unit (excluding the light beam reflecting area) as well as on the rear surface. In this case, it is preferred that the gas supply member is arranged to supply the gas toward the reflection surface of the mirror unit (excluding the light beam reflecting area) and that a fin is provided along the peripheral edge region (or the near-edge region) of the reflection surface to protrude from the reflection surface.

With the production method of the present invention, it is possible to suppress a temperature rise in the mirror unit of the scanner mirror which would be caused by the light beam. This makes it possible to reduce the mechanical displacement (deformation) of the scanner body unit and also to prevent a change in the electric characteristics of the scanner body unit (more particularly, a change in the output of the swing angle sensor employed in the scanner mirror). As a result, it is possible in the powder sintering and laminating process to prevent reduction in the irradiation accuracy of the light beam and to produce a shaped object with increased accuracy. In other words, it becomes possible to obtain a three-dimensionally shaped object with enhanced accuracy in shape.

In particular, since the mirror unit of the scanner mirror makes swing movement at a high speed, it is easy to diffuse the supplied gas. This makes it possible to provide a relatively high heat removal effect through the supply of gas. Although it is the common notion that the high-speed swing movement makes it difficult to remove heat by water cooling, the present invention takes advantage of the swing movement of the mirror unit in an effective way.

The swing movement of the mirror unit allows the gas to efficiently flow along the rear surface or the reflection surface of the mirror unit. In the event that the mirror unit is provided with fins, it becomes possible to increase the cooled surface area (or the heat transfer area) and to effectively guide the gas stream toward the mirror unit. This makes it possible to efficiently suppress a temperature rise in the mirror unit.

DETAILED DESCRIPTION OF THE PREFERRED EMBODIMENTS

Hereinafter, preferred embodiments of the present invention will be described in detail with reference to the accompanying drawings.

(Powder Sintering and Laminating Method)

Figure 5:
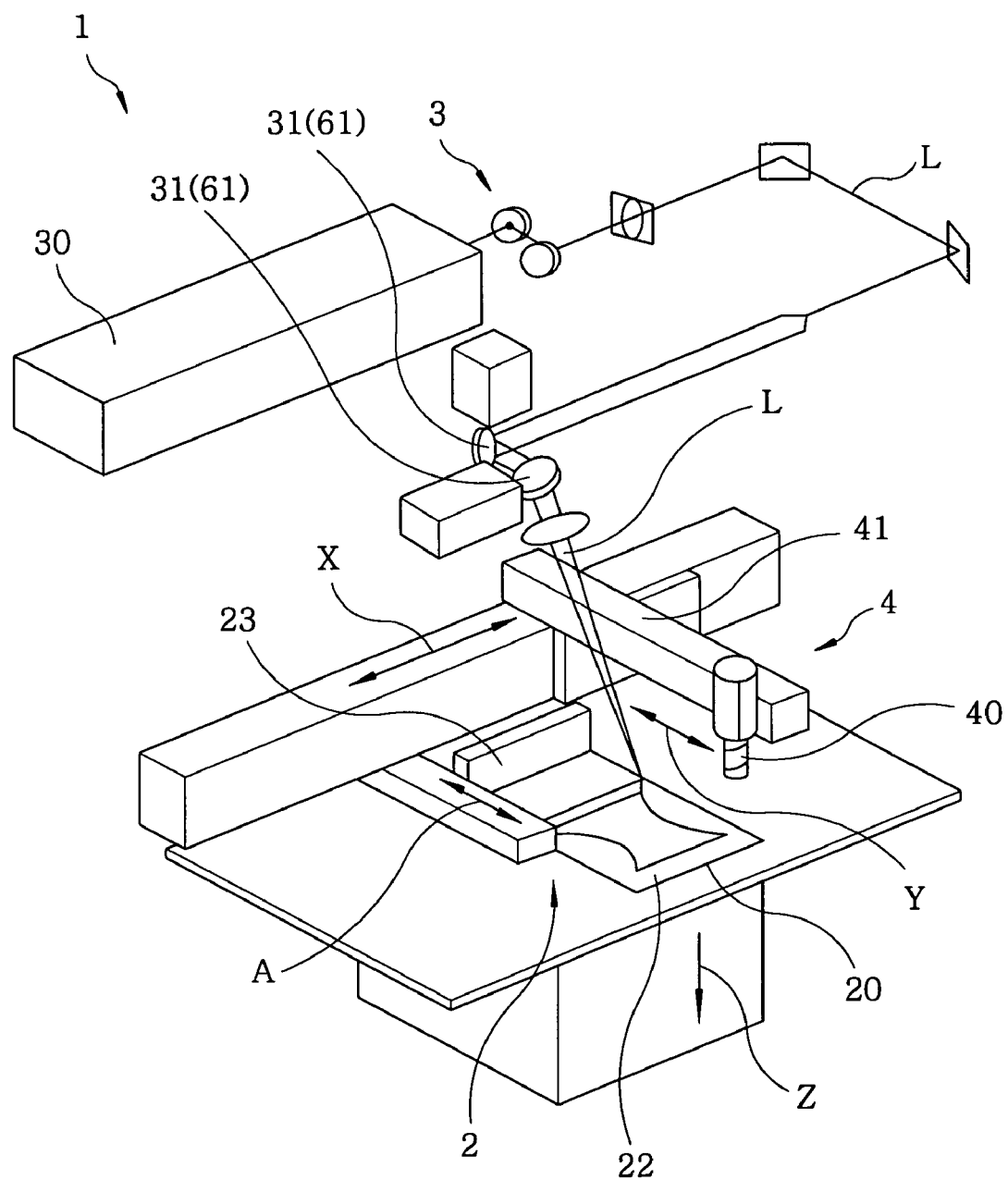
FIG. 5 is a perspective view schematically showing the configuration of a combined optical shaping machine for use in performing a powder sintering and laminating method.
Figure 6A:
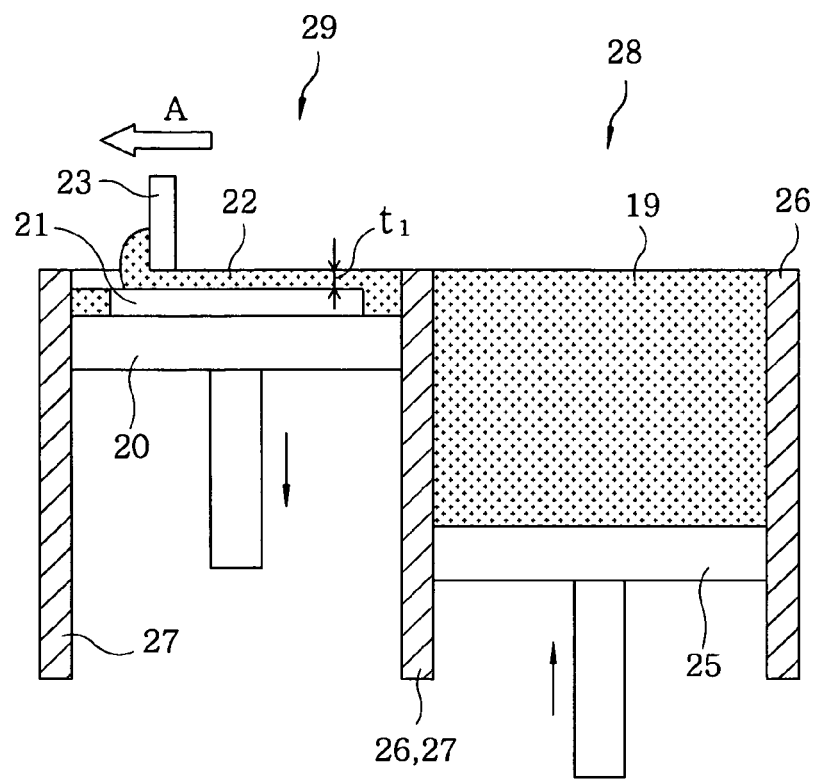
FIGS. 6A and 6B are section views schematically showing the operation of the combined optical shaping machine.
Figure 6B:
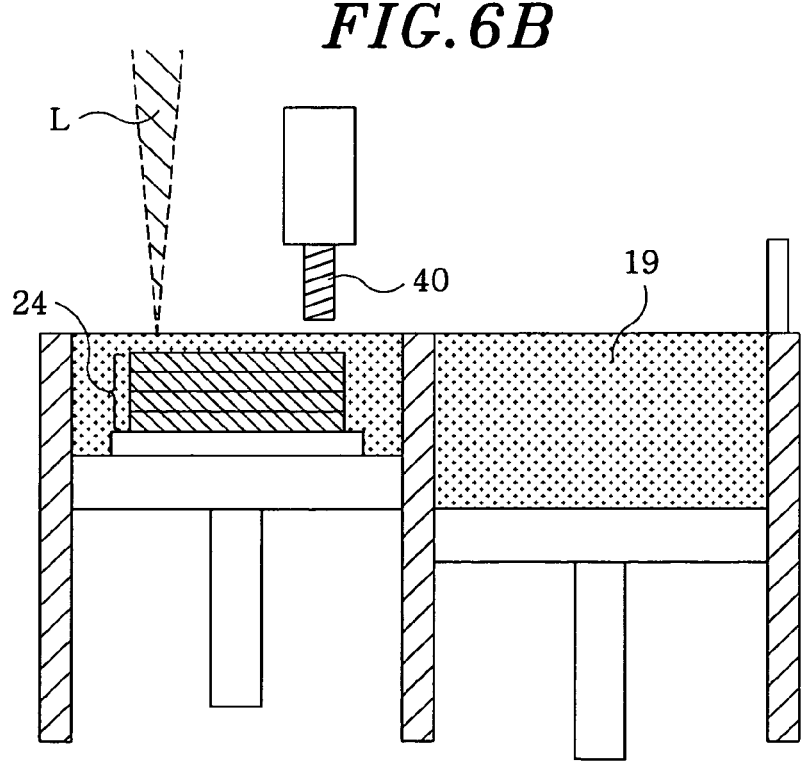

Description will be first made on a powder sintering and laminating method as a premise of the present production method. FIG. 5 shows the configuration of a combined optical shaping machine 1 for use in performing a powder sintering and laminating method. The combined optical shaping machine 1 mainly includes a powder layer forming unit 2 for forming a powder layer by spreading a powder such as a metal powder or a resin powder in a specified thickness, a substrate 20 (see FIGS. 6A and 6B) vertically movable by the operation of a cylinder within a shaping tank 29 whose outer periphery is surrounded by a wall 27, a light beam irradiation unit 3 for irradiating a light beam L on an arbitrary position, and a cutting unit 4 for cutting the peripheral portion of a shaped object. As shown in FIGS. 6A and 6B, the powder layer forming unit 2 mainly includes a powder table 25 vertically movable by the operation of a cylinder within a powdery material tank 28 whose outer periphery is surrounded by a wall 26, a shaping plate 21 arranged on the substrate 20 and serving as a base of the shaped object, and a squeezing blade 23 for forming a powder layer 22 on the shaping plate 21. Referring back to FIG. 5, the light beam irradiation unit 3 mainly includes a light beam oscillator 30 for generating a light beam L (e.g., a directive energy beam such as a laser beam or the like) and a galvano-mirror 31 (or a scanning optical system) for scanning the light beam L on the powder layer 22. If necessary, the light beam irradiation unit 3 may further include a beam shape correction unit for correcting the shape of a light beam spot (namely, a unit including, e.g., a pair of cylindrical lenses and a rotary driver for causing the lenses to rotate about the axis of the light beam L) and an fθ lens. The cutting unit 4 mainly includes a milling head 40 for cutting the peripheral portion of a shaped object and an XY drive unit 41 for moving the milling head 40 to a cutting position.

Figure 7:
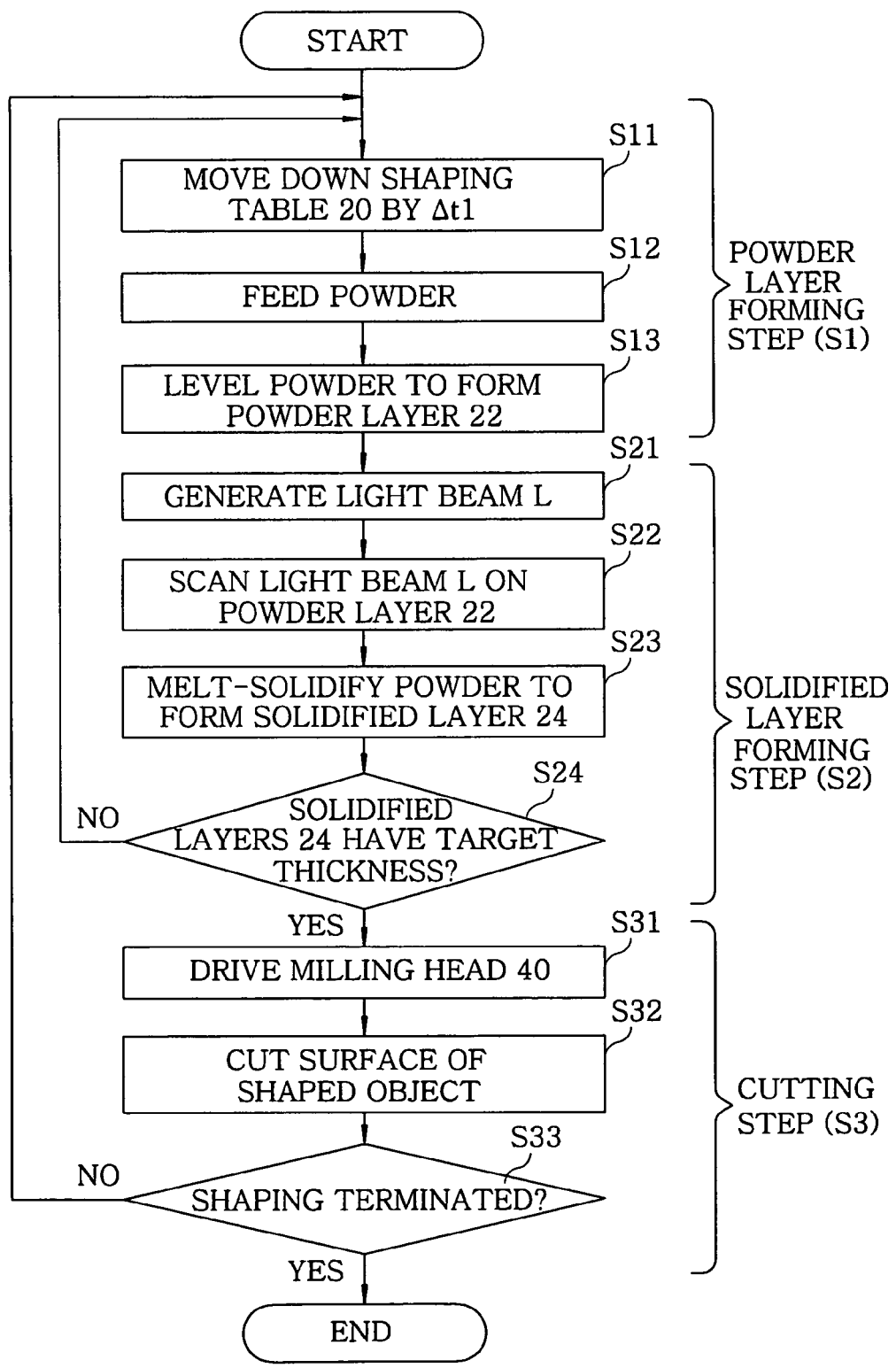
FIG. 7 is a flowchart illustrating the operation of the combined optical shaping machine.

The operation of the combined optical shaping machine 1 will now be described in detail with reference to FIGS. 6A, 6B and 7. FIGS. 6A and 6B schematically show the operation of the combined optical shaping machine 1 and FIG. 7 illustrates the operation flow of the combined optical shaping machine 1.

The operation of the combined optical shaping machine 1 mainly includes a powder layer forming step (S1) for forming a powder layer 22, a solidified layer forming step (S2) for forming a solidified layer 24 by irradiating a light beam L on a specified portion of the powder layer 22 and a cutting step (S3) for cutting a surface of a shaped object. In the powder layer forming step (S1), the substrate 20 is first lowered by Δt1 (S11). Then the powder table 25 is moved up by Δt1. Thereafter, as shown in FIG. 6A, the squeezing blade 23 is moved in the direction indicated by an arrow A, whereby the powder placed on the powder table 25 (e.g., an iron powder having an average particle size of 5 μm to 100 μm or a powder of nylon, polypropylene or ABS resin having an average particle size of 30 μm to 100 μm) is transferred onto the shaping plate 21 (S12) and is leveled to form a powder layer 22 with a predetermined thickness Δt1 (S13). Next, the operation flow proceeds to the solidified layer forming step (S2) in which a light beam L (e.g., a carbon dioxide laser beam or an ultraviolet ray beam) is generated from the light beam oscillator 30 (S21) and is scanned on an arbitrary position of the powder layer 22 through the use of the galvano-mirror 31 (S22). Thus the powder is molten and solidified to form a solidified layer 24 united with the shaping plate 21 (S23).

The powder layer forming step (S1) and the solidified layer forming step (S2) are repeated until the thickness of the solidified layers 24 laminated one above another reaches a target thickness calculated from, e.g., the tool length of the milling head 40 (see FIG. 6B). The newly laminated solidified layer is united with the previously formed lower solidified layer in the sintering and melting process.

If the thickness of the solidified layers 24 thus laminated becomes equal to the target thickness (S24), the operation flow proceeds to the cutting step (S3) in which the milling head 40 is driven (S31). In an instance where the tool (ball end mill) of the milling head 40 is 1 mm in diameter and 3 mm in effective blade length, the milling head 40 is capable of performing a cutting work in a depth of 3 mm. Assuming that the Δt1 is 0.05 mm, the milling head 40 is driven at the time when sixty solidified layers have been formed. The milling head 40 is moved by the XY drive unit 41 in the directions indicated by arrows X and Y, thereby cutting the surface of a shaped object formed of the laminated solidified layers 24 (S32). If the production process of a three-dimensionally shaped object is not completed as yet (S33), the operation flow returns back to the powder layer forming step (S1). Thereafter, the steps S1 through S3 are repeated to laminate additional solidified layers 24, thereby completing the production of the three-dimensionally shaped object.

The irradiation route of the light beam L in the solidified layer forming step (S2) and the cutting route in the cutting step (S3) are preset based on the three-dimensional CAD data. At this time, the processing routes are determined by applying a contour work. In the solidified layer forming step (S2), for example, use is made of the contour shape data of the respective cross-sections obtained by slicing, at an equal pitch (e.g., at a pitch of 0.05 mm if the Δt1 is 0.05 mm), STL data originating from a three-dimensional CAD model.

(Production Method of the Present Invention)

Figure 8:
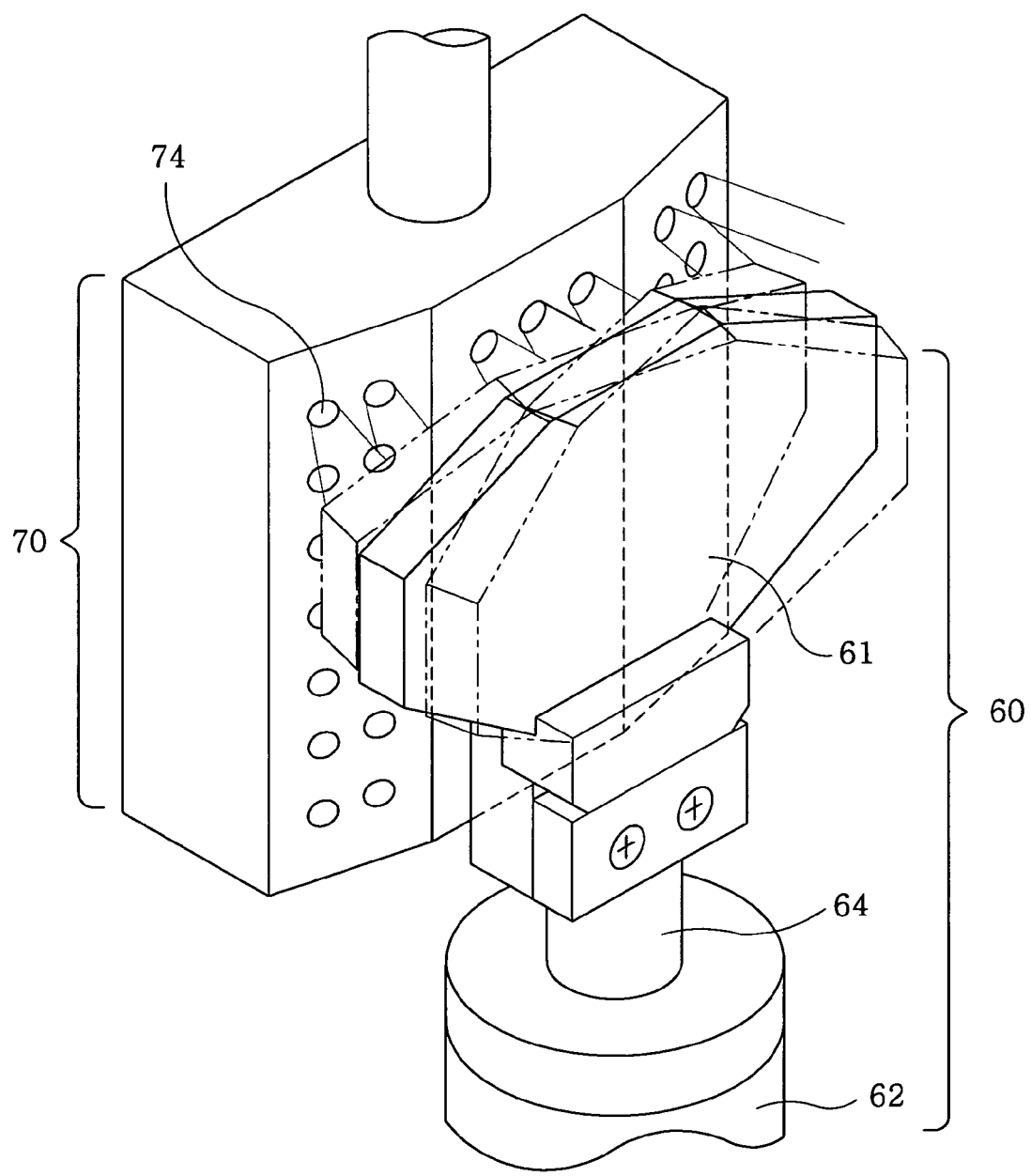
FIG. 8 is a perspective view schematically showing the positional relationship between a scanner mirror and a gas supply member.
Figure 9A:
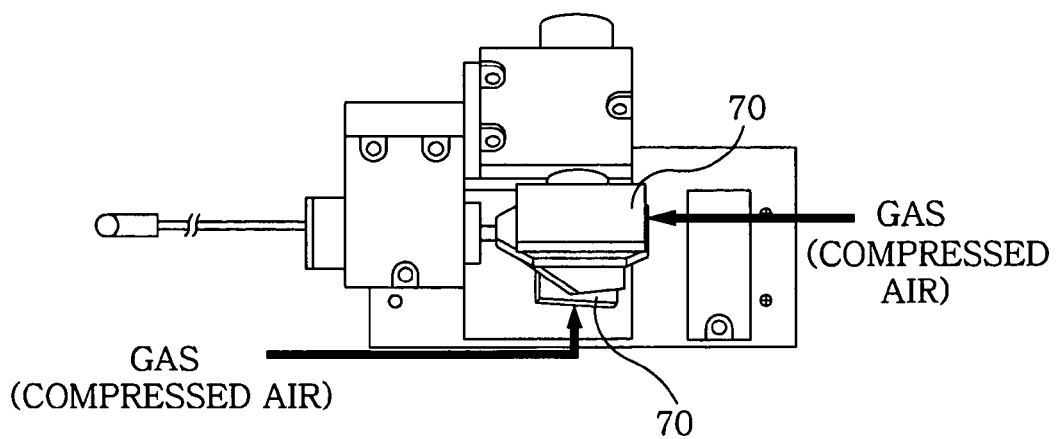
FIGS. 9A to 9C are views schematically showing the gas supply member arranged in the X-direction scanning galvano-mirror and the Y-direction scanning galvano-mirror.
Figure 9B:
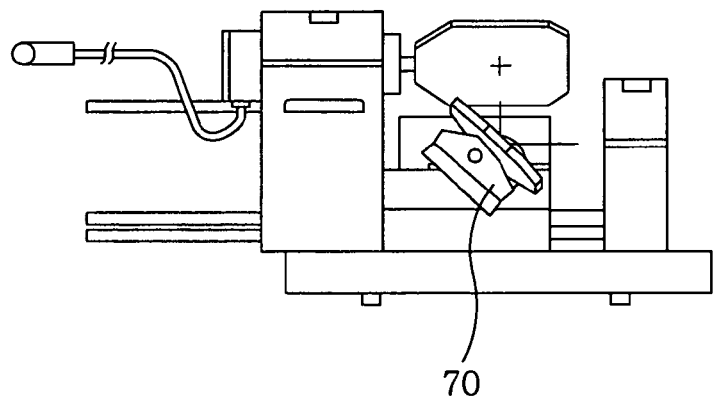
Figure 9C:
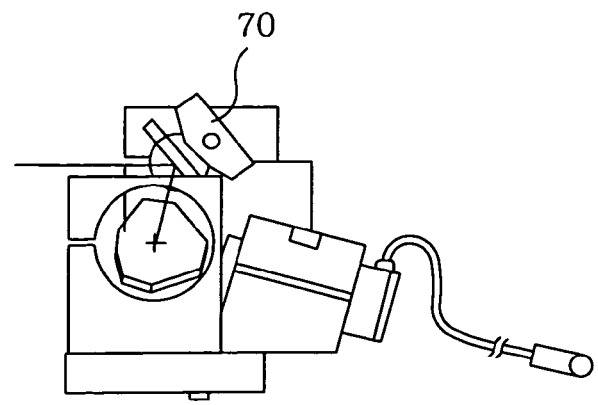

The present production method has been conceived from a scanner mirror (e.g., a galvano-mirror) for deflecting a light beam in the afore-mentioned powder sintering and laminating method. In particular, one of the features of the present invention resides in that, as shown in FIG. 8, a gas is blown toward the rear surface of a mirror unit 61 using a gas supply member 70 (which is also called a gas nozzle). The reason for using the air-cooling method is that the mirror unit 61 makes reciprocating swing movement at a high speed to scan a light beam. FIGS. 9A to 9C schematically show the arrangement state of the gas supply member 70 in the X-direction scanning galvano-mirror and the Y-direction scanning galvano-mirror.

The gas to be blown may be an air (e.g., a compressed air) or, if necessary, a gas which is inert with respect to the mirror unit 61. The inert gas may be a nitrogen gas or a rare gas such as helium gas, argon gas, neon gas or xenon gas. In addition, it is required for the prevention of dew condensation that the gas to be blown contains little vapor. For example, it is preferred that the moisture concentration in the gas to be blown is 1 ppm or less. The moisture concentration (ppm) referred to herein means the volumetric ratio of the moisture (or vapor) to the total volume of the gas (at a standard state of 0° C. and 1 atm) expressed in terms of a million and designates the value measured by a typical dew-point meter. The nitrogen gas is relatively high-priced and, therefore, use of a dry air is cost-effective. The flow rate of the gas blown is in a range of from about 5 SLM to about 50 SLM (where the SLM denotes a unit expressing the quantity by liter of the gas supplied for one minute under a standard state). The optimal value of the gas flow rate is changed depending on the shape of the gas supply member, the size of the mirror unit, the swing angle and swing speed of the mirror unit, and so forth. If the gas flow rate is unduly small, the mirror unit shows reduction in its heat removal effect. In contrast, if the gas flow rate is too great, the reciprocating swing movement of the mirror unit may be adversely affected. The gas blown is preferably kept at a low temperature of about 10° C. to 22° C. but may be maintained at the normal temperature (of about 22° C. to 28° C.) from the standpoint of cost-effectiveness.

Figure 10A:
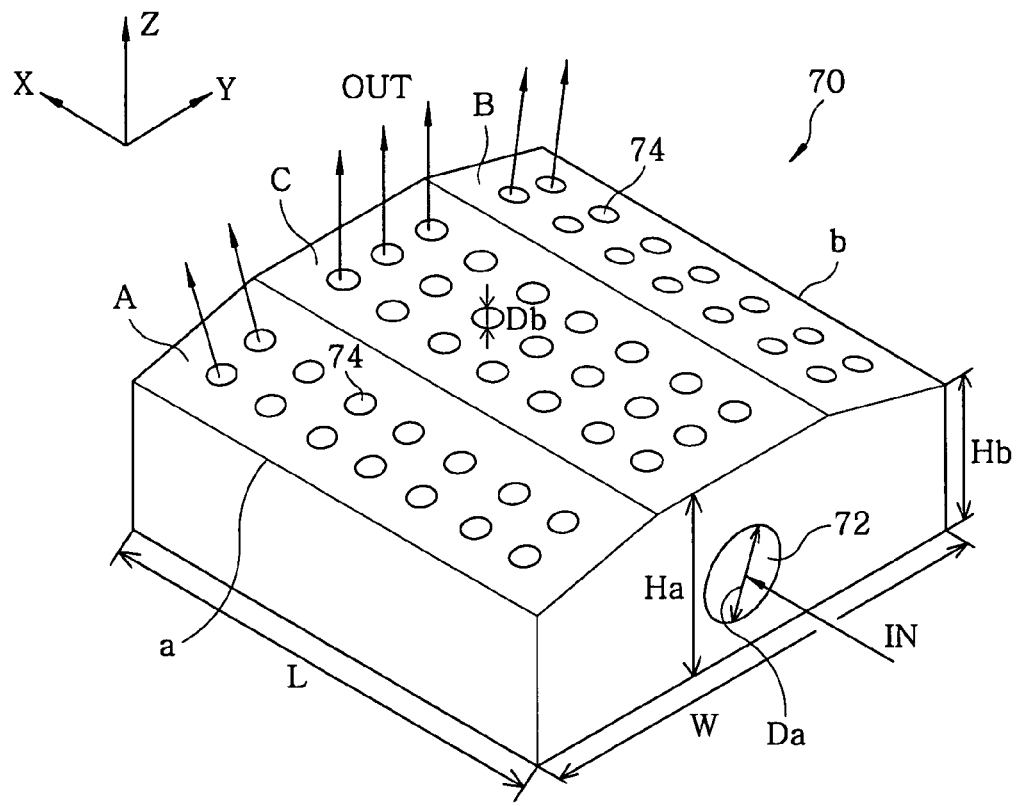
FIG. 10A is a perspective view schematically showing the gas supply member used in the present invention.
Figure 10B:
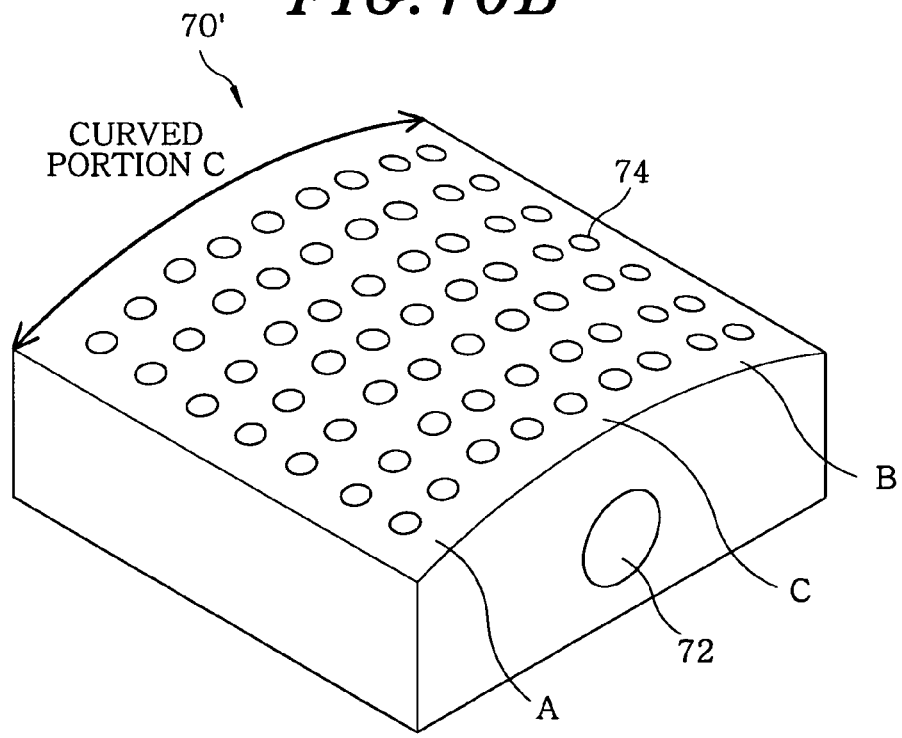
FIG. 10B is a perspective view schematically showing another gas supply member used in the present invention.
Figure 11A:
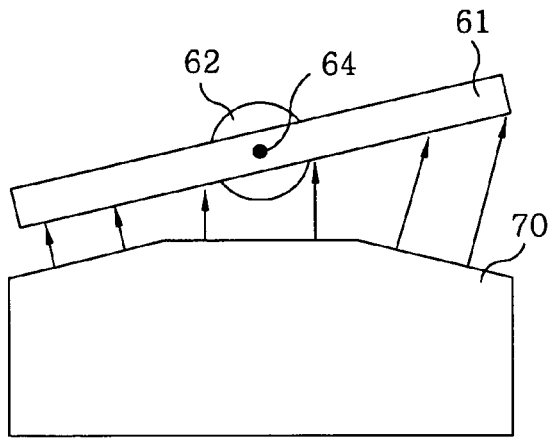
FIGS. 11A to 11C are side views schematically showing the positional relationship between the scanner mirror kept in the maximum swing positions and the gas supply member.
Figure 11B:
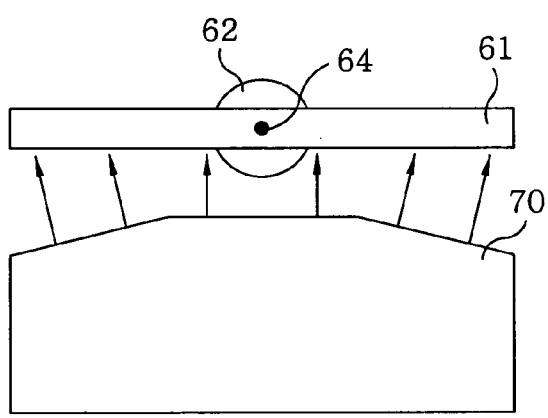
Figure 11C:
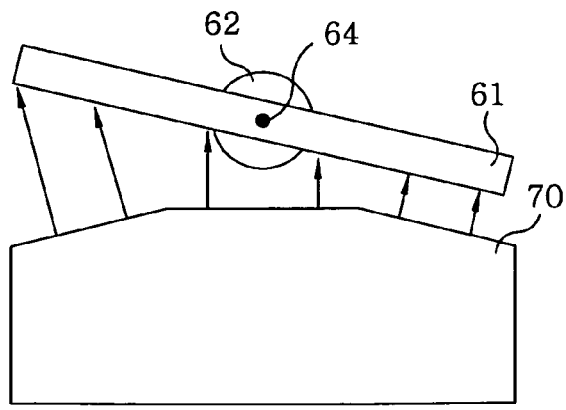
Figure 11D:
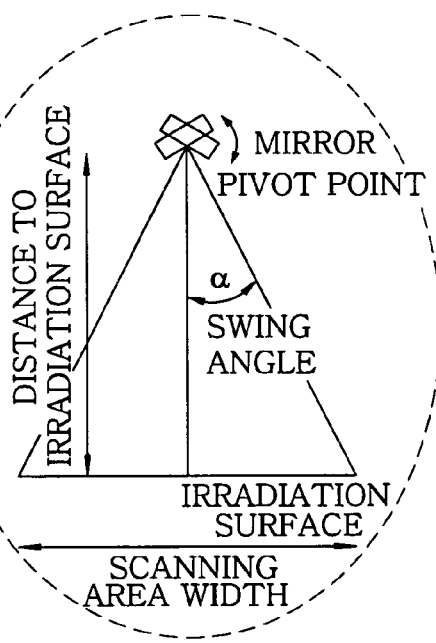
FIG. 11D is a view in which the swing angle α is schematically shown within a dot-line circle).

FIGS. 10A and 10B show two different forms of the gas supply member 70 preferably used in the present invention. The gas supply member 70 shown in FIG. 10A has a hollow internal portion through which an inlet port 72 is in fluid communication with a plurality of outlet ports 74. Connected to the inlet port 72 is a gas supply pipe (not shown) which in turn is connected to a gas supply unit (not shown) including a gas supply pump and so forth. This makes it possible to supply the gas through the gas supply member 70. More specifically, the gas fed from the gas supply pipe flows into the inlet port 72 formed in the side portion of the gas supply member 70 and then flows out from the outlet ports 74 formed in the major surface portion through the hollow portion. Provision of the outlet ports 74 in plural number makes it possible to evenly remove heat from the mirror unit as a whole. In this regard, one may want to install the gas supply member nearer to the mirror unit in an effort to increase the heat removal efficiency (the air cooling efficiency in case of air blowing).

If the gas supply member is too close to the mirror unit, however, it may come into contact with the reciprocatingly swung mirror unit. For that reason, it is preferred that the major surface portion of the gas supply member 70 provided with the outlet ports 74 includes a side region "A" and a side region "B" obliquely formed in conformity with the maximum swing angle of the mirror unit (e.g., about ±15°). In other words, it is preferred that the side regions "A" and "B" are obliquely formed so that the Z-direction size of the gas supply member can be gradually decreased toward the opposite edges "a" and "b" as shown in FIG. 10A. This makes it possible to blow the gas in a position nearer to the reciprocatingly swung mirror unit, as illustrated in FIG. 11. Use of the gas supply member having the shape noted above makes it possible to blow the gas perpendicularly to the mirror unit when the latter is swung to either the right or the left at the maximum angle.

For the same reason as mentioned above, the gas supply member 70' shown in FIG. 10B includes a side region "A", a side region "B" and a central region "C" formed in the major surface portion thereof, all of which are curved in conformity with the maximum swing angle of the mirror unit so that the gas supply member 70' can have a centrally-convex overall shape. In this case, it is equally possible to effectively blow the gas in a position nearer to the reciprocatingly swung mirror unit. It is also possible to blow the gas perpendicularly to the mirror unit when the latter is swung to either the right or the left (More specifically, it is possible to blow the gas perpendicularly to the tangential line of the curved portion "c" shown in FIG. 10B). In addition, the term "maximum swing angle" used herein essentially refers to the angle α schematically illustrated within a dot-line circle in FIG. 11.

Figure 1:
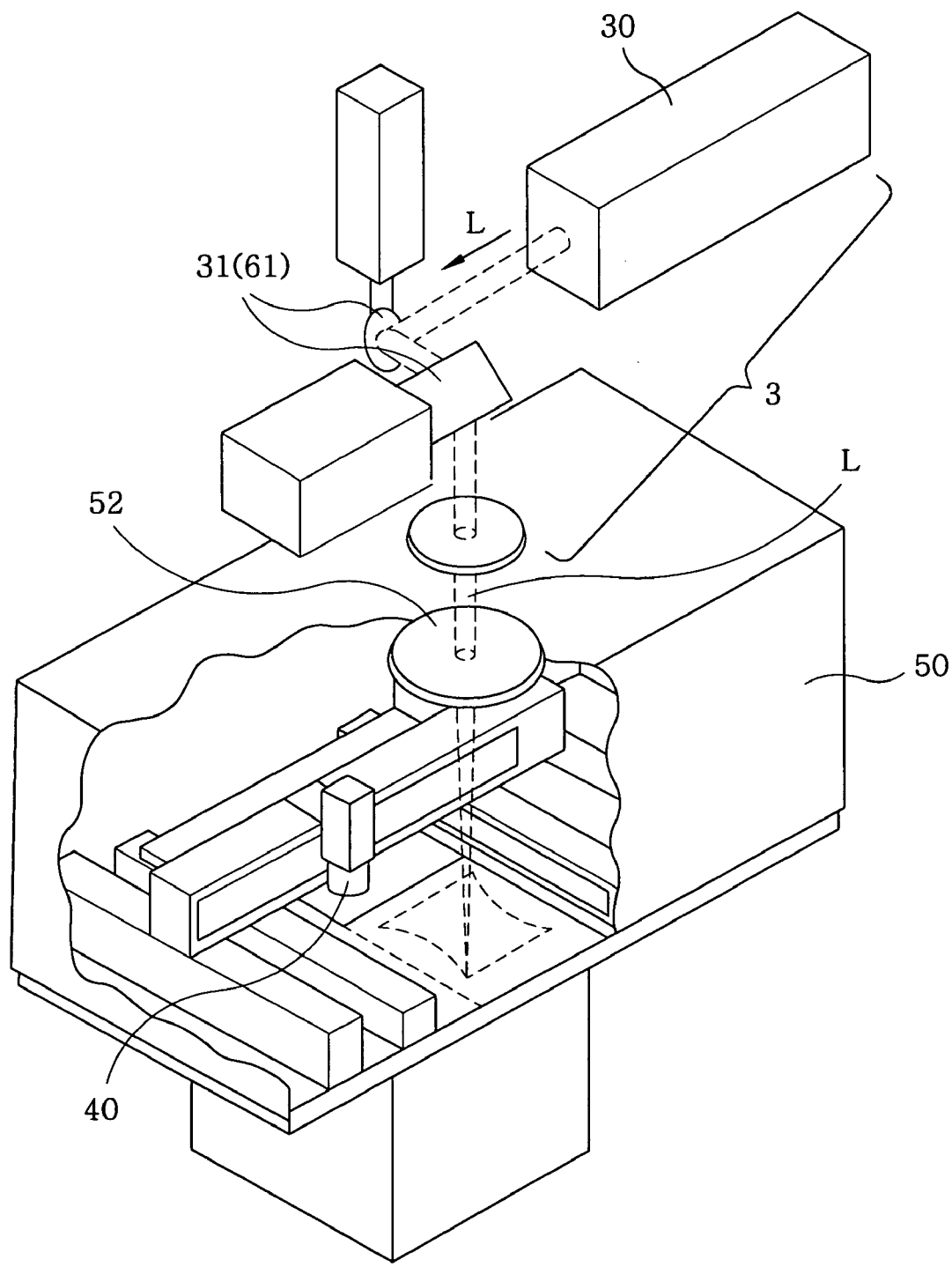
FIG. 1 is a perspective view schematically depicting a manner in which to perform a powder sintering and laminating method.
Figure 2:
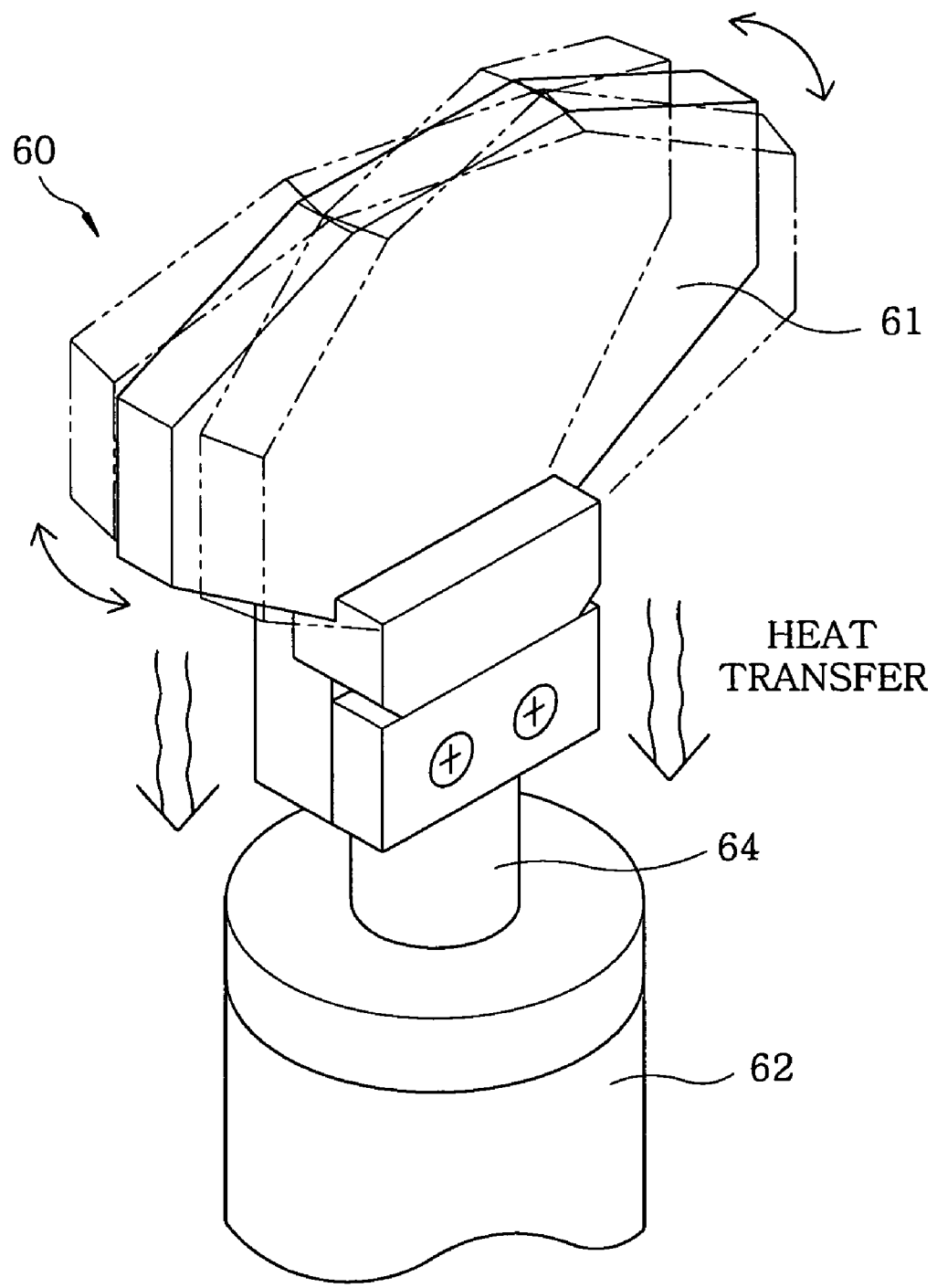
FIG. 2 is a perspective view schematically illustrating a manner in which a scanner mirror makes reciprocating swing movement.
Figure 3:
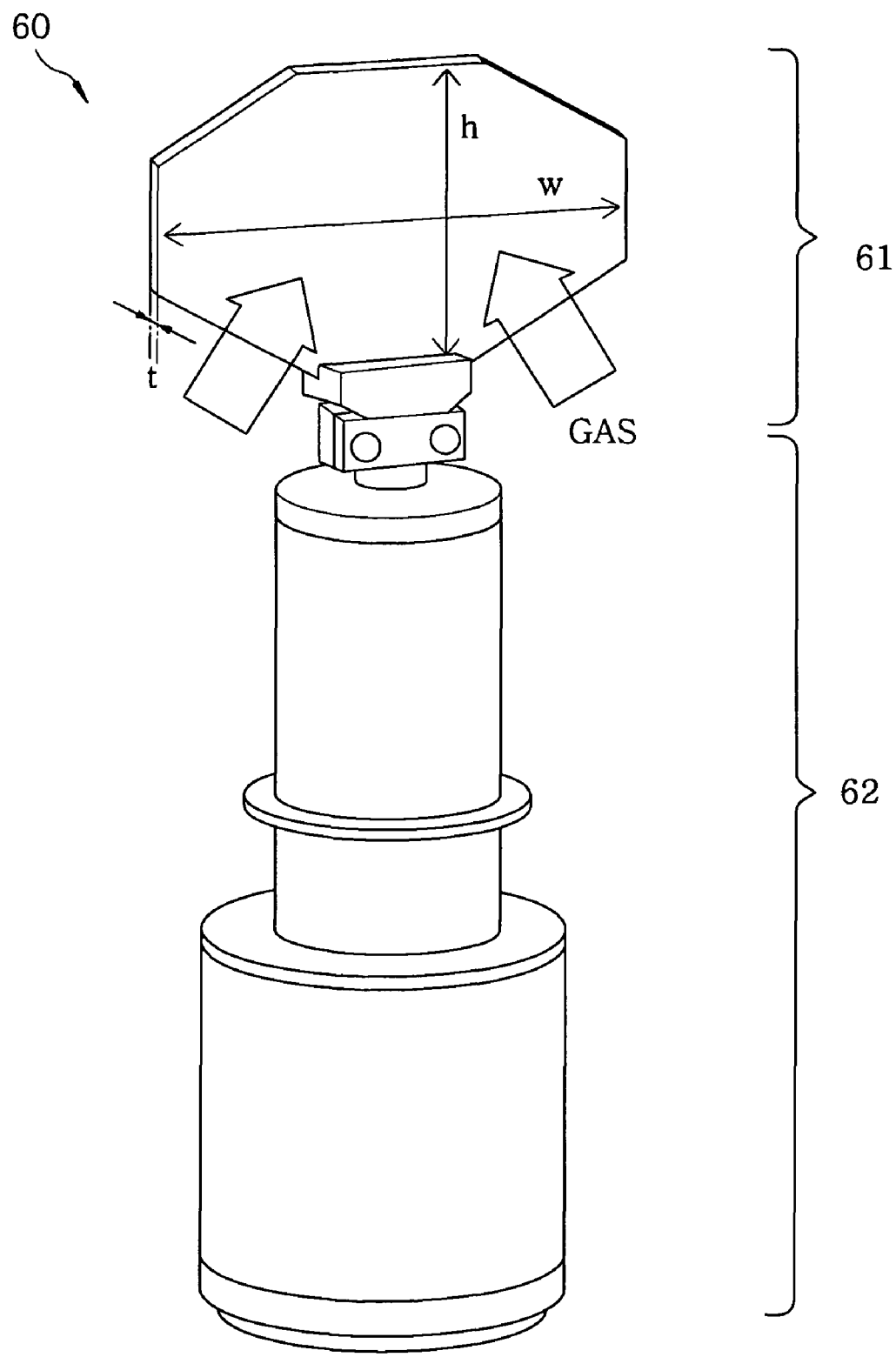
FIG. 3 is a perspective view schematically showing an apparatus in accordance with one embodiment of the present invention.
Figure 4A:
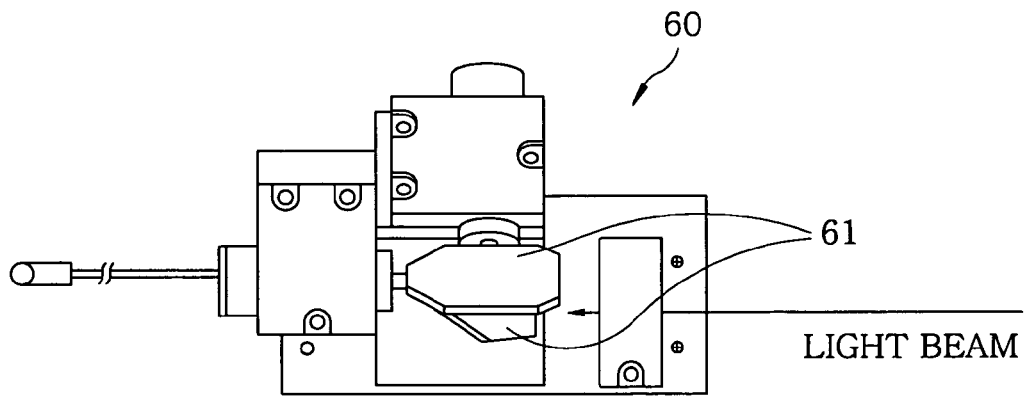
FIGS. 4A to 4C are views schematically showing an X-direction scanning galvano-mirror and a Y-direction scanning galvano-mirror attached to in a scanner mount.
Figure 4B:
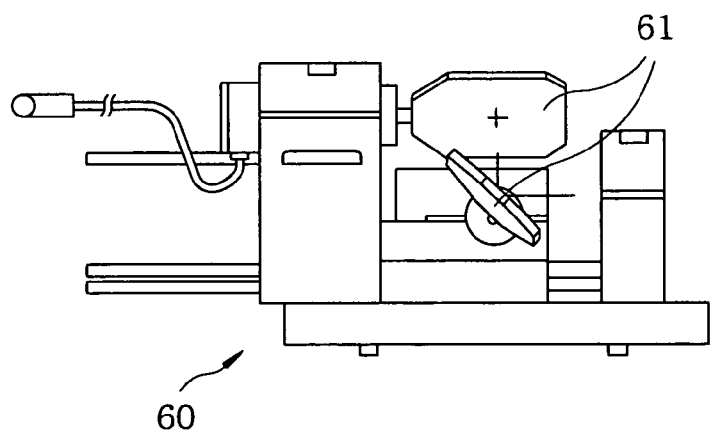
Figure 4C:
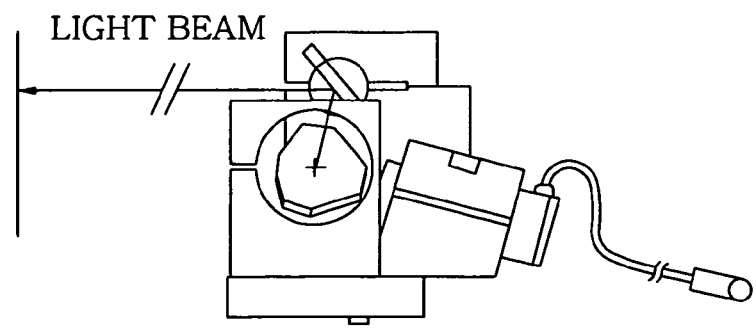

Next, description will be made on the size of the gas supply member 70. Assuming that the galvano-mirror 60 shown in FIG. 3 is used (the mirror unit of which is 40 to 70 mm in height h, 50 mm in width w and 5 mm in thickness t), the various sizes (L, Ha, Hb and W) of the gas supply member 70 shown in FIG. 10A may be such that L is equal to 30 to 80 mm, Ha 15 to 25 mm, Hb 10 to 15 mm and W 40 to 60 mm. In this case, the diameter Da of the inlet port 72 is preferably about 4 to 10 mm and the diameter Db of each of the outlet ports 74 is preferably about 1 to 5 mm. The number of the outlet ports 74 is not particularly limited but may be, e.g., about 10 to 200.

The material of which the gas supply member is made is not particularly limited but may preferably be a metallic material from the viewpoint of strength and durability. Examples of this material include iron, aluminum, stainless steel and corrosion-resistant alloys (e.g., Hastelloy, Inconel and Stellite). Alternatively, the gas supply member may be made of lightweight plastic with superior corrosion resistance. For example, the gas supply member may be made of a polymer material such as an acrylic resin, a vinyl chloride resin, a polycarbonate resin or the like. The production method and processing method of the gas supply member is not particularly limited. The gas supply member may be produced by, e.g., a typical machining technique.

In order not to adversely affect the reflection of the light beam, it is preferred that the gas is supplied to the rear surface of the mirror unit opposite to the reflection surface. The gas may be blown on the reflection surface, provided that it does not adversely affect the reflection of the light beam. For example, the gas may be blown on the peripheral region of the reflection surface and not on the light beam reflecting region. In case where the gas is blown on the reflection surface, it becomes possible to feed the gas to the position and surface nearer to the heat generating point. This assists in increasing the heat removal efficiency in the mirror unit. In other words, the light beam is reflected on the reflection surface and, therefore, the heat is generated in the reflection surface rather than the rear surface of the mirror unit. (More specifically, the heat generated in the reflection surface is transferred to the rear surface.) If the gas is blown toward the reflection surface, the heat removal can be performed in the heat generating surface. This makes it possible to cool the mirror unit in an effective manner. In case where the gas is blown to the reflection surface, it is preferable to blow an inert gas such as nitrogen gas or the like. This makes it possible to effectively prevent degradation (e.g., oxidization) of the outer layer of a mirror surface. In addition, if the gas is blown to the reflection surface, there is provided an effect that the shearing force of the gas stream prevents dust from adhering to the mirror surface. Another effect is that dew condensation on the mirror surface can be prevented by blowing a dry gas on the reflection surface.

In the production method of the present invention, many different measures may be taken in order to assure efficient gas blowing. For example, fins may be provided on the rear surface of the mirror unit so that the gas can flow over the entire region of the rear surface of the mirror unit. Alternatively, fins may be provided to ensure that the gas can be guided to the portion of the rear surface where heat is generated most intensively.

Figure 12A:
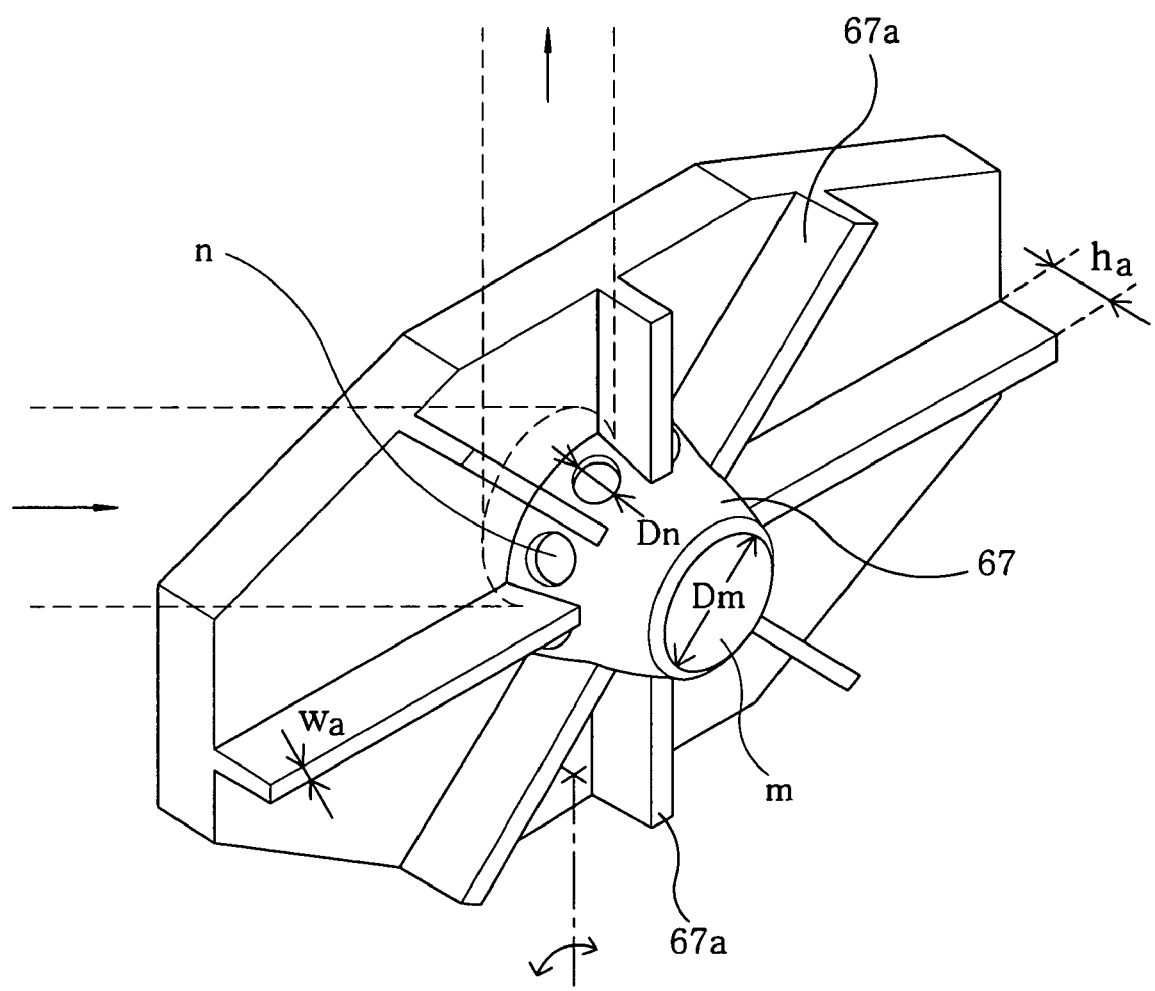
FIG. 12A is a perspective view showing one type of fins provided on the rear surface of a mirror unit.

It may be considered to employ the arrangement shown in FIG. 12A as a specific example in which fins are provided on the rear surface of the mirror unit. In the illustrated arrangement, the fins include a conical column portion (central protruding portion) 67 provided in the central area of the rear surface to protrude from the rear surface and a plurality of plate portions (radial protruding portions) 67a radially extending from the conical column portion 67 and protruding from the rear surface. The conical column portion 67 is preferably provided with a top opening m and a plurality of side openings n, both of which remain in fluid communication with each other. Each of the side openings is positioned between two neighboring plate portions 67a. Assuming that the galvano-mirror 60 shown in FIG. 3 is used (the mirror unit of which is 70 mm in height h, 50 mm in width w and 5 mm in thickness t), the various sizes of the fins are preferably set such that the conical column portion 67 is about 5 mm in protrusion height, about 10 mm in bottom diameter and about 5 mm in top diameter. The top opening m of the conical column portion 67 has a diameter Dm of about 3 to 4.5 mm, while each of the side openings n has a diameter Dn of about 1 to 3 mm. It is also preferred that each of the plate portions 67a has a protrusion height ha of about 5 mm and a width wa of about 1 mm. In the arrangement illustrated in FIG. 12A, the gas supplied toward the top of the conical column portion 67 passes through the top opening m and the hollow internal portion and then flows out from the side openings n. Thereafter, the gas flows along the plate portions 67a toward the peripheral edge portion of the rear surface. With the illustrated example, it becomes possible to allow the gas to flow over the entire area of the rear surface and also to reliably supply the gas to the back side of the light beam reflecting region (namely, the most intensively heated region). This makes it possible to increase the cooling efficiency.

Figure 12B:
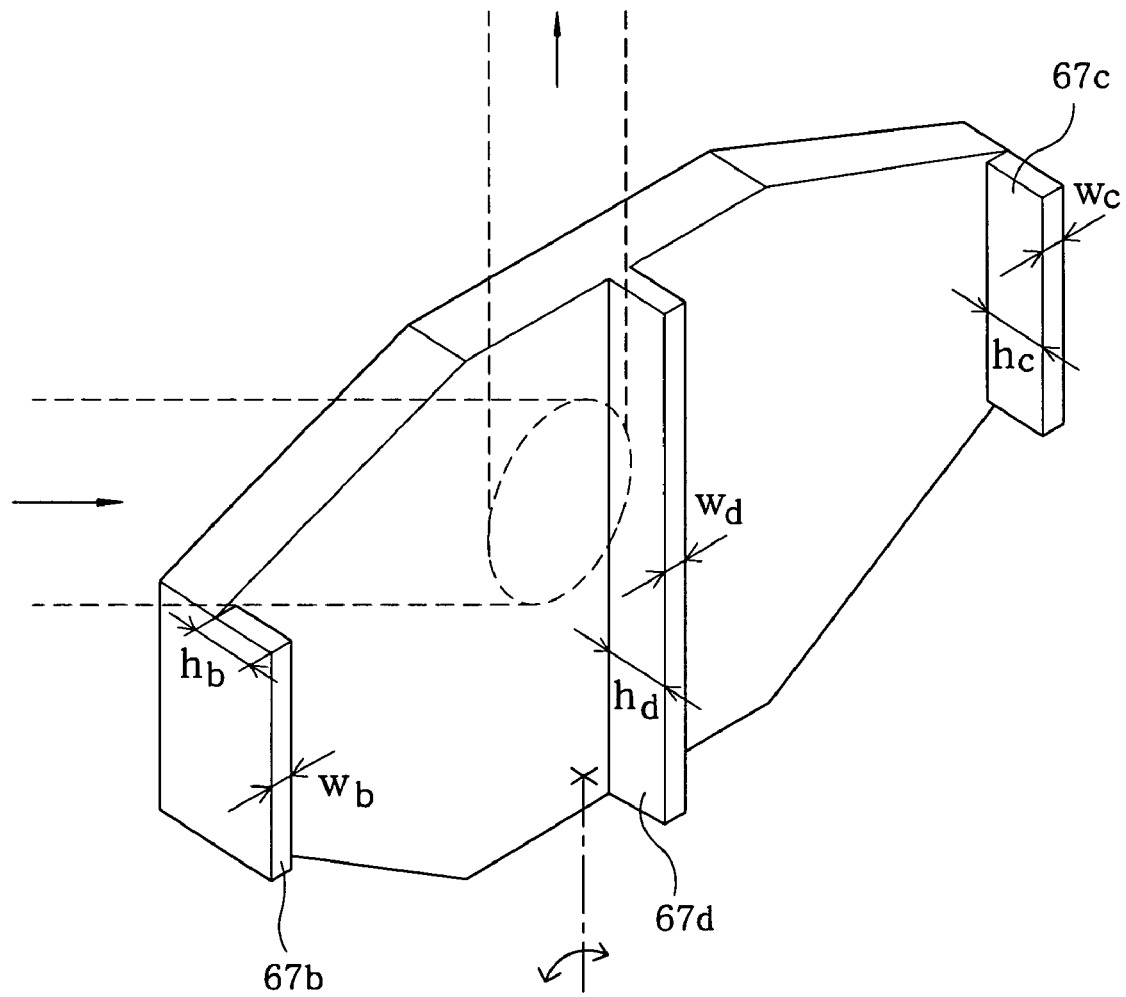
FIG. 12B is a perspective view showing another type of fins provided on the rear surface of a mirror unit.
Figure 12C:
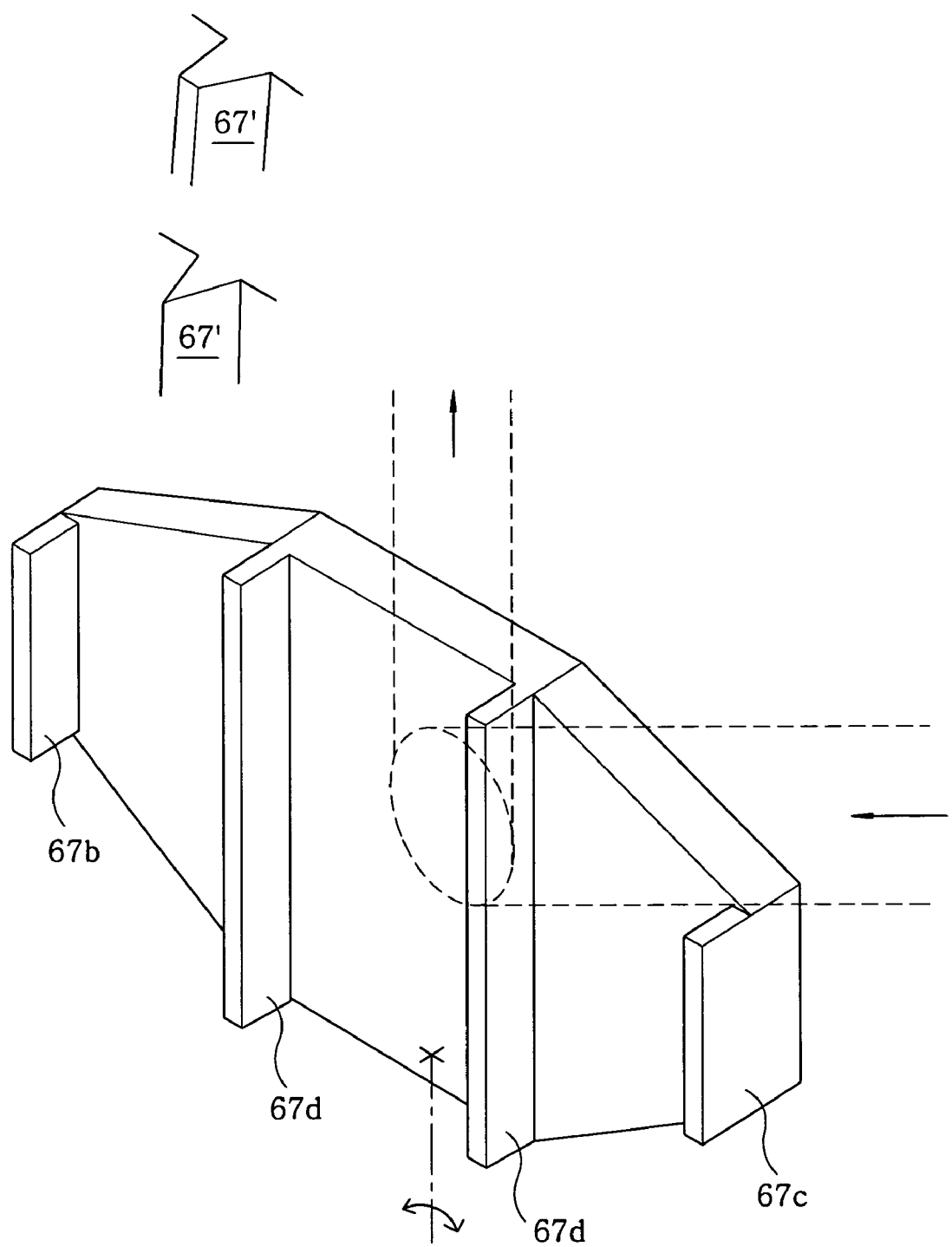
FIG. 12C is a perspective view showing still another type of fins provided on the rear surface of a mirror unit.

As another specific example in which fins are provided on the rear surface of the mirror unit, it may be considered to employ the arrangements shown in FIGS. 12B and 12C. In the illustrated arrangement, the fins include two edge plate portions (edge protruding portions) 67b and 67c provided in the two opposite edge regions of the rear surface to protrude from the rear surface and at least one intermediate plate portion (intermediate protruding portion) 67d positioned between the edge plate portions 67b and 67c to protrude from the rear surface. More specifically, it is preferred that the edge plate portions 67b and 67c are formed in the peripheral regions of the mirror unit in a parallel relationship with the rotational axis of the mirror unit and that the intermediate plate portion 67d is arranged between the edge plate portions 67b and 67c in a parallel relationship therewith. Assuming that the galvano-mirror 60 shown in FIG. 3 is used (the mirror unit of which is 40 mm in height h, 50 mm in width w and 5 mm in thickness t), the plate portions 67b, 67c and 67d are preferably about 3 to 5 mm in protrusion height hb through hd and about 1 to 2 mm in width wa through wc. Two intermediate plate portions 67d are employed in the arrangement shown in FIG. 12C. It is preferred that the spacing between the intermediate plate portions 67d is generally equal to the light beam diameter (e.g., about 10 to 50 mm). In the arrangement shown in FIG. 12B, the gas supplied toward the intermediate plate portion 67d is split apart by the intermediate plate portion 67d and then flows toward the edge plate portions 67b and 67c along the rear surface of the mirror unit. Subsequently, the gas flows along the surfaces of the edge plate portions 67b and 67c, which assists in increasing the cooling efficiency of the mirror unit. In case of the example shown in FIG. 12C, the gas supplied to the rear surface of the mirror unit is readily held in the region between the two intermediate plate portions 67d. This makes it possible to reliably supply the gas to the light beam reflecting region (namely, the most intensively heated region), which helps to further increase the cooling efficiency. If the intermediate plate portions 67d are formed to have a cross section of triangular shape or generally triangular shape as designated by reference numeral 67' in the upper portion in FIG. 12C, the supplied gas is easily split apart and is allowed to flow in an efficient manner.

Figure 12D:
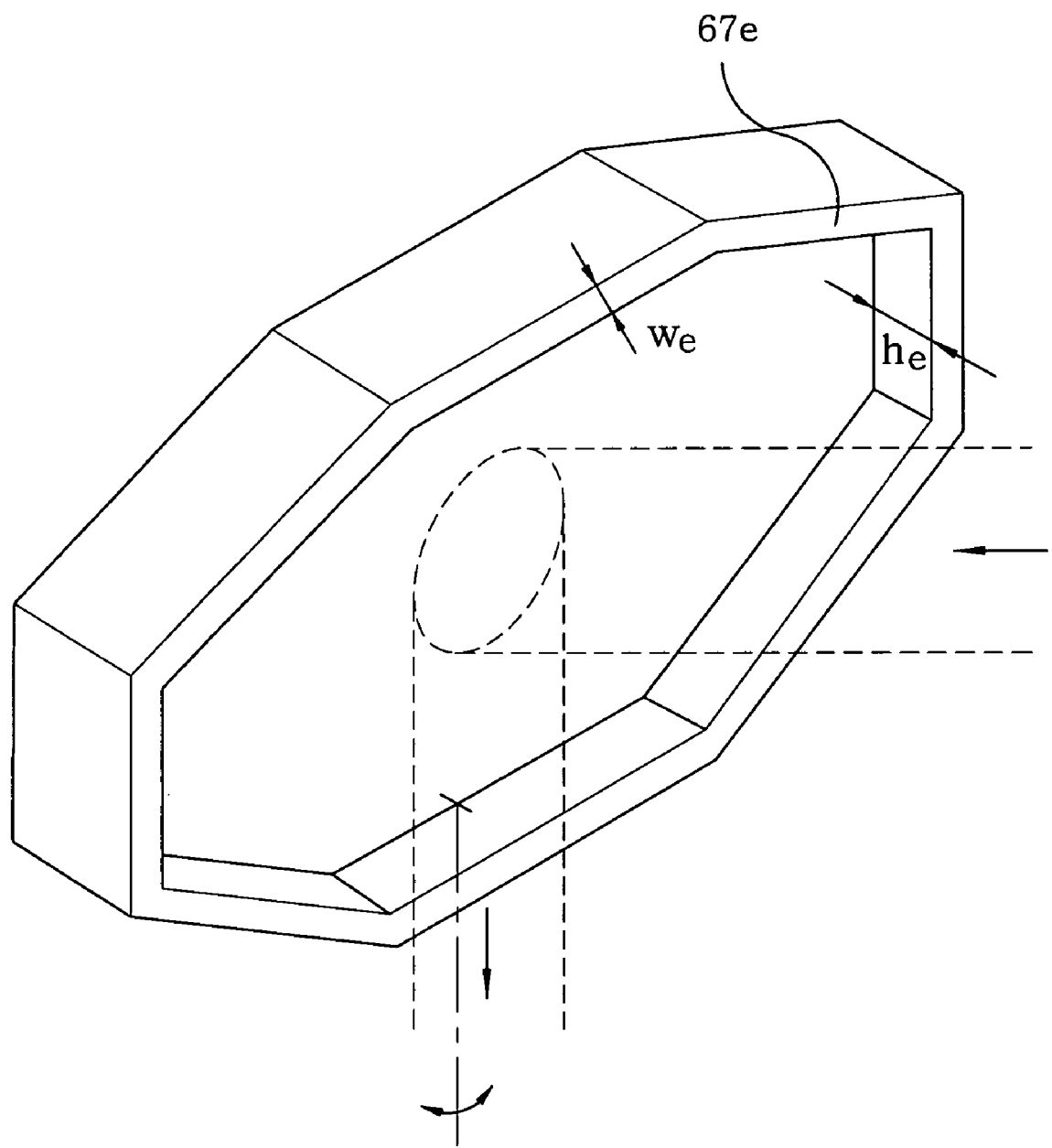
FIG. 12D is a perspective view showing one type of fin provided on the reflection surface of a mirror unit.

The fins may be provided on the front surface of the mirror unit as well as on the rear surface. For example, it may be considered to employ the arrangement shown in FIG. 12D. In the illustrated arrangement, the gas supply member is provided to supply the gas toward the reflection surface of the mirror unit. The fins include a plate portion 67e provided along the edge region of the reflection surface to protrude from the reflection surface. It is particularly preferred that, as illustrated in FIG. 12D, the plate portion 67e is provided along the peripheral portion of the reflection surface to surround the light beam reflecting region. It is also preferred that the plate portion 67e has such a size as not to interfere with the light beam irradiated and reflected. Preferably, the plate portion 67e has a symmetrical size with respect to the rotational axis (namely, the mirror axis) so that a balance can be established during the reciprocating swing movement of the mirror unit. Assuming that the galvano-mirror 60 shown in FIG. 3 is used (the mirror unit of which is 40 mm in height h, 50 mm in width w and 5 mm in thickness t), the plate portion 67e is preferably about 1 to 5 mm in protrusion height he and about 1 to 3 mm in width we. In the arrangement illustrated in FIG. 12D, some parts of the gas supplied to the peripheral edge portion of the reflection surface flow toward the reflection surface but the remaining parts of the gas flow without impinging against the reflection surface (the mirror unit). With the arrangement illustrated in FIG. 12D, the area of the fin itself (or the area serving as a cooling fin) is great. This makes it possible to effectively suppress a temperature rise in the mirror unit. In the arrangement illustrated in FIG. 12D, the plate portion 67e may be provided to have a cross section of triangular shape or generally triangular shape, if necessary.

The fins may be provided by providing the plate portions and the conical column portion independently of the mirror unit or by integrally producing them with the mirror unit. In case where the fins are provided independently of the mirror unit, it is preferred that the plate portions and the conical column portion of the fins are made of a metallic material such as iron, aluminum, stainless steel or corrosion-resistant alloys (e.g., Hastelloy, Inconel and Stellite).

In the production method of the present invention, it is preferable to control, particularly feedback control, the supply quantity and temperature of the gas depending on the temperature of the mirror unit. In other words, it is preferred in the powder sintering and laminating method of the present invention that at least one of the gas supply quantity and the gas supply temperature is controlled by detecting the temperature of the mirror unit of the scanner mirror on a real time basis and feeding the detected value back to a gas supply control unit. In this case, a contact type thermometer such as a thermocouple and a non-contact type thermometer such as an infrared thermometer can be used as a temperature sensor. The contact type thermometer is provided on the rear surface of the mirror unit and is suitable for use in measuring the temperature of the rear surface. In contrast, the non-contact type thermometer is suitable for use in measuring the temperature of the reflection surface of the mirror unit as well as the temperature of the rear surface. The gas supply control unit determines and controls the supply quantity and temperature of the gas based on the difference between the detected temperature and the target temperature. It is preferred that the control of gas supply quantity is performed by controlling a valve such as an electromagnetic valve or the like installed in the gas supply pipe. It is also preferred that the control of gas temperature is performed by controlling a heat exchanger (e.g., a dual tube type heat exchanger) installed in the gas supply pipe. The target temperature of the mirror unit is preferably about 15 to 35° C. Although there is a need to prevent a temperature rise in the scanner body unit, it is not desirable to unduly cool the scanner body unit. Therefore, it is preferred that the control of gas temperature is performed in such a manner as to keep the temperature of the scanner body unit as constantly as possible.

Figure 13A:
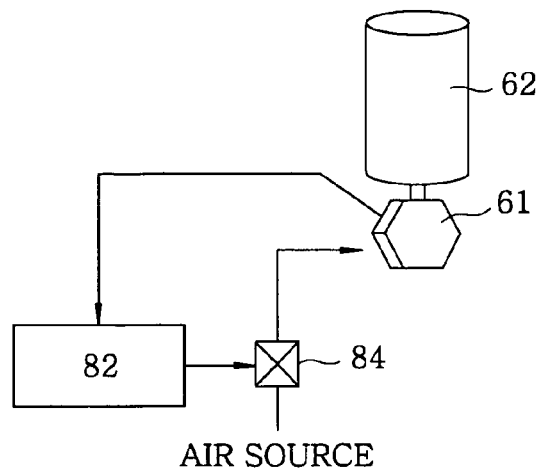
FIGS. 13A through 13C are views schematically showing a feedback control method.
Figure 13B:
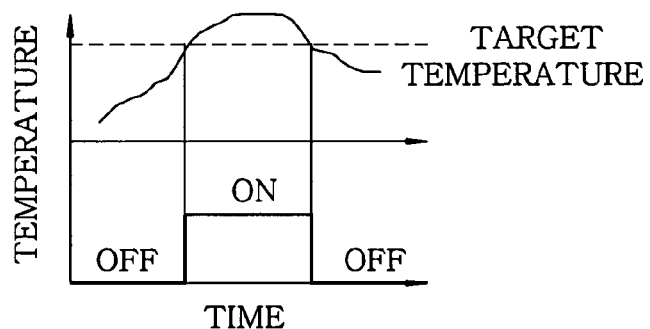

As one feedback control method, it may be considered to use, e.g., the method shown in FIG. 13A. In this method, a temperature sensor (e.g., a thermocouple or an infrared thermometer) is provided on the rear surface of the mirror unit to detect the temperature of the rear surface on a real time basis. If the detected temperature is higher than the target temperature, the electromagnetic valve is automatically operated to start supplying the gas (e.g., blowing the air). The gas supply is stopped if the detected temperature grows equal to or less than the target temperature (see FIG. 13B).

Figure 13C:
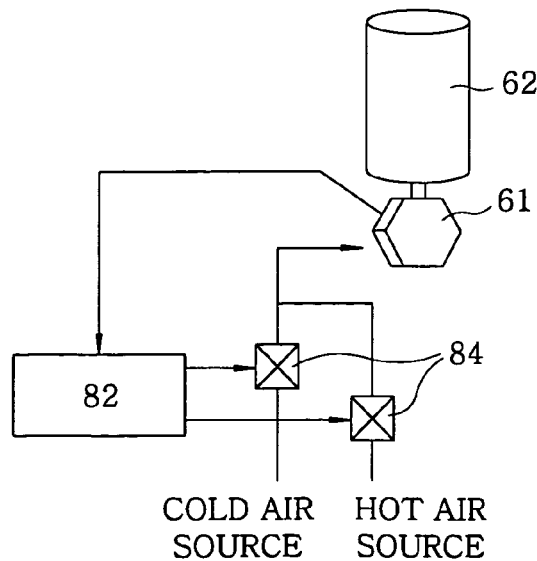

It may be considered to use the feedback control method shown in FIG. 13C. In this method, cold air blowing and hot air blowing are used in combination in supplying the gas. A temperature sensor (e.g., a thermocouple or an infrared thermometer) is provided on the rear surface of the mirror unit to detect the temperature of the rear surface on a real time basis. In order to keep the rear surface at a target temperature, a cold air blowing electromagnetic valve and a hot air blowing electromagnetic valve are automatically operated according to the detected temperature. If necessary, a cold air blowing heat exchanger and a hot air blowing heat exchanger may be additionally controlled according to the detected temperature.

(Production Apparatus of the Present Invention)

Next, description will be made on an apparatus suitable for performing the production method of the present invention (Description will be made on one example of the apparatus in which a metal powder is used as the powder and the solidified layer is a sintered layer).

As shown in FIGS. 1, 5, 6A, 6B and 8, the present apparatus includes a powder layer forming unit 2 for forming a metal powder layer, a light beam irradiation unit 3 for irradiating a light beam on a specified portion of the metal powder layer to form a sintered layer, and a substrate 20 on which the metal powder layer and/or the sintered layer are formed. The light beam irradiation unit 3 includes a mirror unit 61 or 31 for use in scanning the light beam and a gas supply member 70 for supplying a gas to the mirror unit 61 or 31. Since the powder layer forming unit 2, the light beam irradiation unit 3 and the substrate 20, as well as the operation of the present production apparatus, have already been described in connection with the powder sintering and laminating method, no description will be made in that regard to avoid redundancy.

The mirror unit 61 of the scanner mirror includes a reflection surface from which a light beam is reflected and a rear surface opposite to the reflection surface. It is preferred that, as shown in FIG. 8, the outlet ports 74 of the gas supply member 70 are arranged to face the rear surface of the mirror unit 61.

In the production apparatus of the present invention, many different measures may be taken in order to assure efficient gas blowing. For example, it is preferred that fins are provided on the rear surface of the mirror unit so that the gas can flow over the entire region of the rear surface of the mirror unit. Since the fins have already been described in connection with the production method, no description will be made in that regard to avoid redundancy.

Figure 14A:
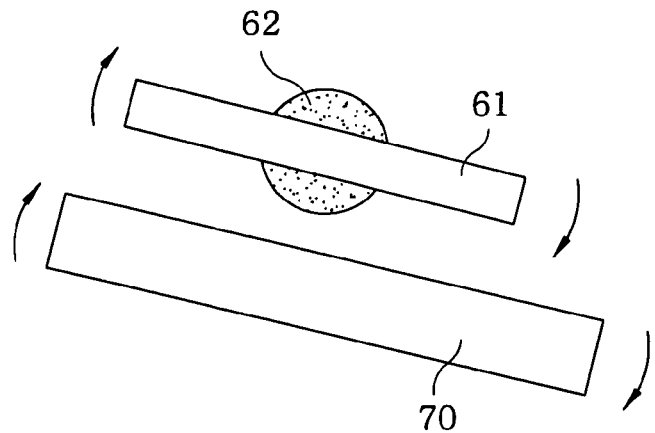
FIGS. 14A through 14C are side views schematically showing a manner in which the gas supply member is moved together with the mirror unit.
Figure 14B:
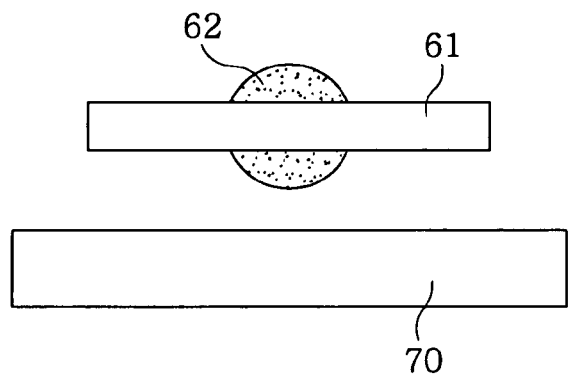
Figure 14C:
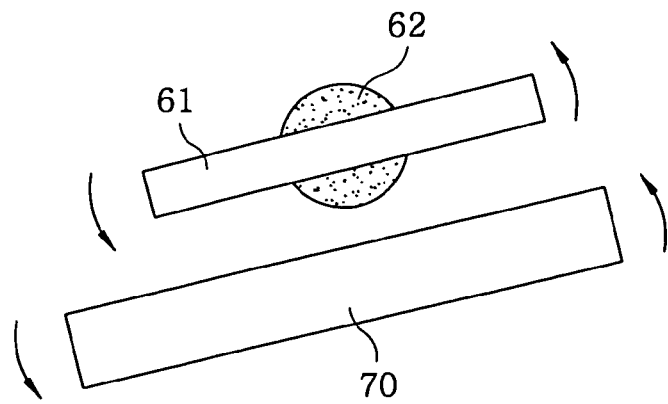

In place of, or in addition to, the provision of fins, it may be possible to employ an arrangement in which the gas supply member is moved in synchronization with the movement of the mirror unit. More specifically, as shown in FIGS. 14A through 14C, the gas supply member 70 is swung to the right if the mirror unit 61 makes right swing movement (see FIG. 14A) and to the left if the mirror unit 61 makes left swing movement (see FIG. 14C). In order to assure synchronized movement of the mirror unit and the gas supply member, the signal for controlling the operation of the mirror unit may be used as a signal for controlling the operation of the gas supply member. If the gas supply member is moved in synchronization with the movement of the mirror unit, there is no possibility that the gas supply member comes into contact with the reciprocatingly swung mirror unit even when the gas supply member is positioned near the mirror unit (The air cooling effect can be enhanced by arranging the gas supply member nearer to the mirror unit). As a consequence, it becomes possible to make planar the major surface portion of the gas supply member 70 (see FIG. 10A) and to simplify the shape of the gas supply member 70.

While certain embodiments of the present invention have been described hereinabove, they are nothing more than illustration of typical examples falling within the scope of the present invention. Therefore, the present invention shall not be limited to the foregoing embodiments. It will be apparent to those skilled in the art that many changes or modifications may be made without departing from the scope of the invention.

For example, although the foregoing description is directed to an arrangement in which the gas is blown against the mirror unit (see FIG. 3), the present invention shall not be limited to this arrangement. If necessary, the gas may be blown toward the mirror shaft 64 and the scanner body unit 62 (see FIG. 8).

Although some parts of the foregoing description are based on the premise that the powder layer is a metal powder layer and the solidified layer is a sintered layer, it will be readily understood by those skilled in the art that the same features and effects are provided even if the powder layer is a resin powder layer and the solidified layer is a cured layer.

EXPERIMENTAL EXAMPLE

In order to confirm the effects provided by the present invention, the temperatures of the X-direction and Y-direction scanning galvano-mirrors were measured over time in a case of air cooling control and a conventional case without the air cooling control. The air cooling control conditions are as follows:

Gas supplied: compressed air
   Gas flow rate: 20 SLM
   Gas temperature: 20° C.

Figure 15A:
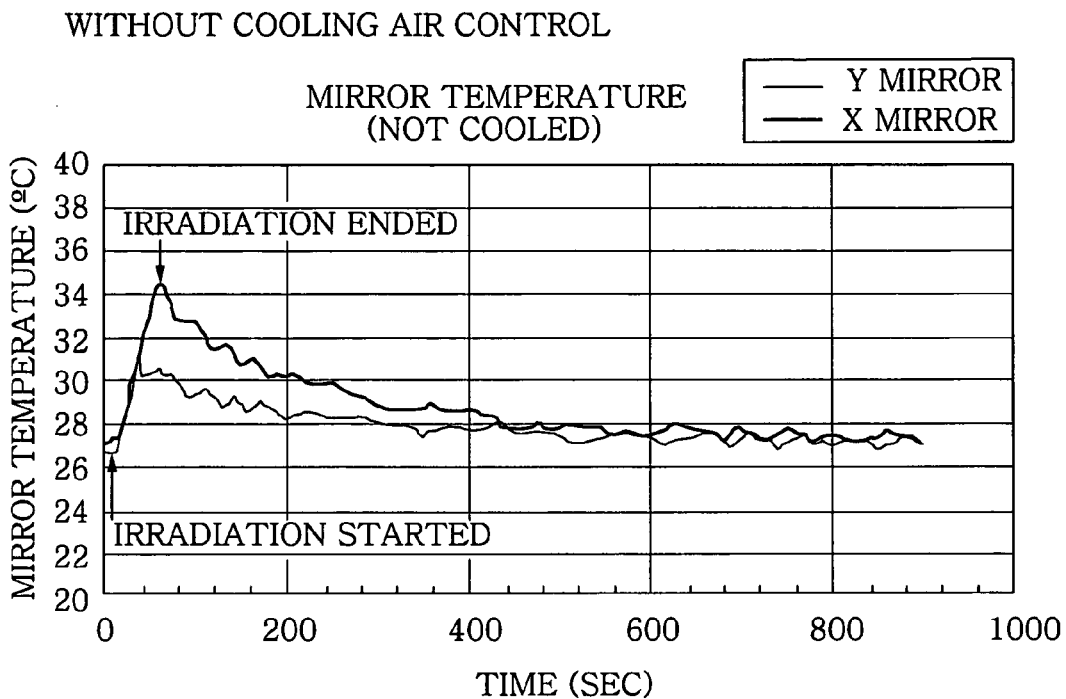
FIGS. 15A and 15B are graphs representing the results of experiment in the embodiment of the present invention.
Figure 15B:
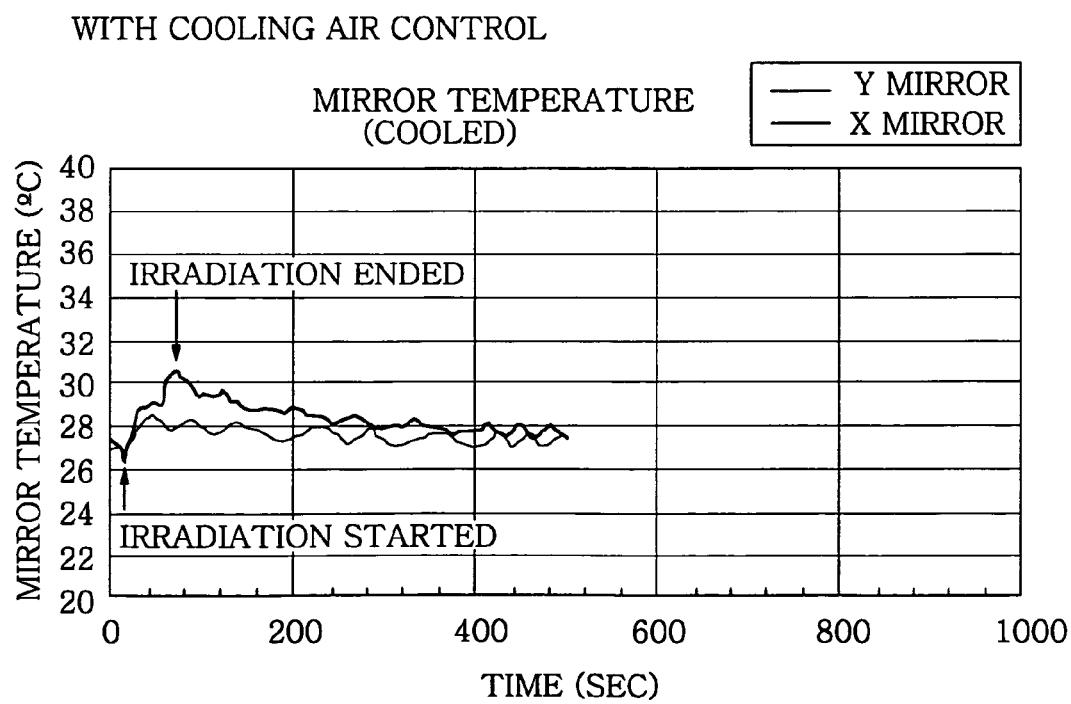

The results are shown in FIGS. 15A and 15B. FIG. 15A shows the results obtained in the conventional case without the air cooling air control, and FIG. 15B represents the results obtained in the case of the air cooling control employed in the present invention. The results shown reveal that the present invention is effective in preventing a temperature rise in the mirror unit. It can also be understood from the results shown in FIGS. 15A and 15B that the temperature of the mirror unit can be kept substantially constant according to the present invention.

INDUSTRIAL APPLICABILITY

Various kinds of objects can be produced by performing the present method for producing a three-dimensionally shaped object. For example, in case where the powder layer is a metal powder layer and the solidified layer is a sintered layer, the three-dimensionally shaped object thus obtained can be used as a mold such as a mold for the injection molding of plastics, a press mold, a die-casting mold, a casting mold, a forging mold or the like. In case where the powder layer is a resin powder layer and the solidified layer is a cured layer, the three-dimensionally shaped object thus obtained can be used as a resin article.

What is claimed is:

1. An apparatus for producing a three-dimensionally shaped object, comprising:
   a unit for forming a powder layer;
   a light beam irradiation unit for irradiating a light beam on a specified portion of the powder layer to form a solidified layer; and
   a substrate on which the powder layer and/or the solidified layer are formed, wherein the light beam irradiation unit includes:
      a mirror for use in scanning the light beam, wherein the mirror has a reflection surface for reflecting the light beam and a rear surface opposite to the reflection surface;
      a gas supply member for supplying a gas to the mirror, wherein the gas supply member has a gas outlet port arranged to face the rear surface of the mirror;
      a first support member which supports the mirror such that the mirror is allowed to make a reciprocating swing movement about the first support member while scanning the light beam; and
      a second support member which supports the gas supply member,
      wherein the first support member and the second support member are separated from each other and the rear surface of the mirror and the gas outlet port are separated from each other.

2. The apparatus of claim 1, wherein the gas supply member is movable in synchronization with a movement of the mirror.

3. The apparatus of claim 1, wherein fins are provided on the rear surface of the mirror to allow the gas to flow over the entire area of the rear surface.

4. The apparatus of claim 3, wherein the fins include a central protruding portion provided in a central area of the rear surface and a plurality of radial protruding portions radially extending from the central protruding portion, and the central protruding portion has a top opening and a plurality of side openings, the top opening and the side openings communicating with each other.

5. The apparatus of claim 3, wherein the fins include two edge protruding portions provided in two opposite peripheral regions of the rear surface of the mirror and at least one intermediate protruding portion provided between the two end protruding portions.

6. The apparatus of claim 1, wherein the gas supply member is arranged to supply the gas to the reflection surface of the mirror and a fin is provided along a peripheral edge portion of the reflection surface to protrude from the reflection surface.

7. The apparatus of claim 1, wherein the first support member and the second support member are arranged such that the mirror and the gas supply member are movable independently to each other.

8. The apparatus of claim 1, wherein the mirror is configured to make reciprocating swing movement while the gas supply member outlet stops.

9. The apparatus of claim 1, wherein the gas supply member has a major surface portion on which the gas outlet port is formed, and
   wherein the major surface portion includes a central region and two side regions connected to two opposite sides of the central region, each of the side regions being obliquely formed with respect to the central region to prevent the major surface portion from blocking the swing movement of the mirror.

10. The apparatus of claim 1, wherein the gas supply member has a major surface portion on which the gas outlet port is formed, and
   wherein the major surface portion is curved such that the gas supply member has a centrally-convex overall shape to prevent the major surface portion from blocking the swing movement of the mirror.

11. The apparatus of claim 7, wherein the gas supply member has a major surface portion on which the gas outlet port is formed, and
   wherein the major surface portion includes a central region and two side regions connected to two opposite sides of the central region, each of the side regions being obliquely formed with respect to the central region to prevent the major surface portion from blocking the swing movement of the mirror.

12. The apparatus of claim 7, wherein the gas supply member has a major surface portion on which the gas outlet port is formed, and
   wherein the major surface portion is curved such that the gas supply member has a centrally-convex overall shape to prevent the major surface portion from blocking the swing movement of the mirror.

13. The apparatus of claim 7, wherein the mirror is configured to make reciprocating swing movement while the gas supply member stops.

14. The apparatus of claim 8, wherein the gas supply member has a major surface portion on which the gas outlet port is formed, and
   wherein the major surface portion includes a central region and two side regions connected to two opposite sides of the central region, each of the side regions being obliquely formed with respect to the central region to prevent the major surface portion from blocking the swing movement of the mirror.

15. The apparatus of claim 8, wherein the gas supply member has a major surface portion on which the gas outlet port is formed, and wherein the major surface portion is curved such that the gas supply member has a centrally-convex overall shape to prevent the major surface portion from blocking the swing movement of the mirror.

16. An apparatus for producing a three-dimensionally shaped object, comprising:
a unit for forming a powder layer;
a light beam irradiation unit for irradiating a light beam on a specified portion of the powder layer to form a solidified layer; and
a substrate on which the powder layer and/or the solidified layer are formed,
wherein the light beam irradiation unit includes a mirror for use in scanning the light beam and a gas supply member for supplying a gas to the mirror,
wherein the mirror has a reflection surface for reflecting the light beam and a rear surface opposite to the reflection surface,
wherein the gas supply member has a gas outlet port arranged to face the rear surface of the mirror,
wherein the rear surface of the mirror and the gas outlet port are separated from each other,
wherein the gas supply member has a major surface portion on which the gas outlet port is formed, and
wherein the major surface portion includes a central region and two side regions connected to two opposite sides of the central region, each of the side regions being obliquely formed with respect to the central region to prevent the major surface portion from blocking the swing movement of the mirror.

17. The apparatus of claim 16, wherein the mirror is configured to make reciprocating swing movement while the gas supply member stops.

18. An apparatus for producing a three-dimensionally shaped object, comprising:
a unit for forming a powder layer;
a light beam irradiation unit for irradiating a light beam on a specified portion of the powder layer to form a solidified layer; and
a substrate on which the powder layer and/or the solidified layer are formed,
wherein the light beam irradiation unit includes a mirror for use in scanning the light beam and a gas supply member for supplying a gas to the mirror,
wherein the mirror has a reflection surface for reflecting the light beam and a rear surface opposite to the reflection surface,
wherein the gas supply member has a gas outlet port arranged to face the rear surface of the mirror,
wherein the rear surface of the mirror and the gas outlet port are separated from each other,
wherein the gas supply member has a major surface portion on which the gas outlet port is formed, and
wherein the major surface portion is curved such that the gas supply member has a centrally-convex overall shape to prevent the major surface portion from blocking the swing movement of the mirror.

19. The apparatus of claim 18, wherein the mirror is configured to make reciprocating swing movement while the gas supply member stops.

* * * * *